US007024084B2

(12) United States Patent
Akutsu et al.

(10) Patent No.: US 7,024,084 B2

(45) Date of Patent: Apr. 4, 2006

(54) ELECTRODEPOSITION SOLUTION, OPTICAL PART PRODUCED THEREFROM, AND PRODUCTION METHOD FOR SAME OPTICAL PART

(75) Inventors: Eiichi Akutsu, Ashigarakami-gun (JP); Shigemi Ohtsu, Ashigarakami-gun (JP); Keishi Shimizu, Ashigarakami-gun (JP); Kazutoshi Yatsuda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 213 days.

(21) Appl. No.: 10/389,983

(22) Filed: Mar. 18, 2003

(65) Prior Publication Data

US 2004/0057688 A1 Mar. 25, 2004

(30) Foreign Application Priority Data

Sep. 20, 2002 (JP) ............................ 2002-275907

(51) Int. Cl.
*G02B 6/10* (2006.01)

(52) U.S. Cl. ...................... 385/129; 385/130; 385/131; 385/132

(58) Field of Classification Search ................ 385/129, 385/130, 131, 132
See application file for complete search history.

(56) References Cited

U.S. PATENT DOCUMENTS 6,849,171 B1 * 2/2005 Shimizu et al. ............... 205/91

FOREIGN PATENT DOCUMENTS

| | | |
|---|---|---|
| JP | B2 2599497 | 1/1997 |
| JP | A 10-119414 | 5/1998 |
| JP | B2 2854669 | 11/1998 |
| JP | A 11-133224 | 5/1999 |
| JP | A 11-174790 | 7/1999 |
| JP | A 11-189899 | 7/1999 |
| JP | A 11-335894 | 12/1999 |

OTHER PUBLICATIONS

Maruno, Journal of Electronic Information and Communication Society, vol. 84, No. 9, pp. 656-662, 2001.

* cited by examiner

*Primary Examiner*—Jennifer Doan
(74) *Attorney, Agent, or Firm*—Oliff & Berridge, PLC

(57) ABSTRACT

An electrodeposition solution comprising an electrodeposition material including at least an electrodepositive polymer material, which comprises hydrogen atoms, and capable of forming an electrodeposition film by depositing the electrodeposition material from the electrodeposition solution, wherein 10% to 90% of the hydrogen atoms are substituted by heavy hydrogen atoms and a transmission loss of the electrodeposition film to light in a wavelength region of 700 nm to 1,350 nm is no more than 1 dB/cm.

13 Claims, 6 Drawing Sheets

ELECTRODEPOSITION SOLUTION, OPTICAL PART PRODUCED THEREFROM, AND PRODUCTION METHOD FOR SAME OPTICAL PART

BACKGROUND OF THE INVENTION

1. Field of the Invention

The present invention relates to an electrodeposition solution for forming a fine pattern to be used for producing an optical part utilizing light rays in an infrared (IR) region, particularly an optical part such as a various types of information processing elements, optical circuit elements and the like, which are formed on a substrate such as an optical waveguide, an optical part produced by using the electrodeposition solution, and a production method for the optical part.

2. Description of the Related Art

As a material to be employed for forming an optical waveguide for an optical circuit, inorganic materials such as quartz, a variety of glass materials, light transmissive oxide type ferroelectrics and the like and a variety of polymer materials have been used. Among these materials, as compared with an inorganic material, a polymer material easily forms a thin film by a spin coating method, a dipping method and the like, is flexible and in addition to these points, polymer material is suitable for producing an optical waveguide with a large surface area.

Further, in a thin film formation method using such a polymer material, as compared with a thin film formation method using an inorganic material such as quartz, a heating step using a high temperature at the time of thin film formation is not required. Therefore, use of a polymer material has an advantage in that an optical waveguide can be formed even on a substrate such as a semiconductor substrate, a plastic substrate and the like, for which are difficult to subject to heating treatments at high temperature. Further, production of a flexible optical waveguide utilizing the flexibility and toughness of a polymer material is made possible.

Accordingly, economical mass production of an optical waveguide part for an optical integrated circuit to be employed in optical communication, an optical wiring board to be employed in a field of optical information processing and the like from a polymer material for optical use has been desired.

Conventionally, such a polymer material for optical use was inferior in environmental resistance and weathering resistance such as heat resistance, moisture resistance and the like, so that there were problems regarding retention of stability of optical characteristics, however, recently, improvements have been made. Further in a case in which a photosensitive polymer material is used as a polymer material for optical use, formation and processing in production are extremely easy and the mass productivity is also excellent.

However, a photosensitive polymer material employed conventionally is a polymer material in a solid state at a room temperature and when a thick film is formed using the photosensitive polymer material, scattering in a UV region and a visible light region becomes significant and the light transmissivity is deteriorated. Further, in the case of forming a pattern just like an optical waveguide by a photolithographic method or the like, the resolution deteriorates at the time of curing the photosensitive polymer material. Therefore, even if a conventional photosensitive polymer material is used to produce an optical waveguide or the like, a pattern can not be produced as designed with a sufficiently high regeneration and it results in an undesirable effect of a transmission loss of the produced optical waveguide or the like.

Further, since in such a conventionally used photosensitive polymer material as described above consideration regarding properties necessary for an optical material such as decrease of the transmission loss in wavelength region to be used for information transmission is insufficiently, it also has a defective point that the optical waveguide loss is high. Therefore, an optical part of an optical waveguide or the like produced from such a photosensitive polymer material is unsatisfactory in terms of practical use and durability.

As a means for solving the above-mentioned problems, a method for forming a pattern of an optical waveguide or the like using a photocurable resin in a liquid state at room temperature instead of the polymer material in a solid state at room temperature has been considered. However, since the photocurable resin has fluidity, the coating film thickness would change after application of the photocurable resin and a pattern of an optical waveguide or the like could not be formed with good reproducibility and controllability.

Further, in the case of pattern formation using a conventional photosensitive polymer material, etching treatment or the like is needed and thus there are disadvantages in that a large quantity of a harmful alkaline waste solution is generated; the production cost is high due to a large number of processing steps; and that the production line becomes complicated, long and large.

On the other hand, today, as light rays to be used as optical communication means for transmitting a large quantity of information in a long distances, infrared rays in a wavelength range of 1.3 μm to 1.5 μm are generally used in order to suppress attenuation in a quartz material, which is a main material of optical waveguide parts employed for such optical communication. Further, from now on, the needs for transmitting a large quantity of information based on the utilization of light as information transmitting medium are expected to rapidly expand in information transmission and processing not only in a conventional long distance but also in local areas (short distances) such as conventional households and offices.

The optical material used for such transmission and processing of large quantity of information in local areas is required to have suitable properties to be able to be processed and formed into complicated shapes such as connectors and various optical circuits such as an optical waveguide in addition to being mainly used in the form of an optical fiber-like shape for long distance communication and to have various functions such as ease of connection and the like. However, although there is no problem at all in terms of the transmission loss, the quartz material is a fragile material and therefore has inferior processibility and formability, and is difficult to handle and form into a complicated patterns. Accordingly, the quartz material is technically difficult to use as an optical material for local areas.

Thus, a resin material is being paid attention for the processibility, formability and ease of handling of the resin material as an optical material for information transmission in local areas. As compared with the quartz material, the resin material is inferior regarding the transmission loss and the transmissivity in the IR region employed in the optical communication. However, with respect to the transmission loss, since the transmission distance is a short distance, transmission loss as low as that of the quartz material is not required and therefore, it is possible to use even the resin material sufficiently.

Further, since a conventional resin material contains many hydrogen atoms in its molecule, the transmissivity in the IR region of the resin material is insufficient for the optical communication which will be required in the future. However, converting the light rays with a wavelength in a wavelength range of 1.3 to 1.5 μm, which range is utilized for long distance communication, into light rays with wavelength shorter than 850 nm and then distributing the light rays with wavelength shorter than 850 nm to local areas is being researched. If the light rays are such IR rays with wavelength as short as 850 nm, even the resin material is thought to be sufficient for practical application.

For example, according to Maruno, et al. (Maruno, Journal of Electronic Information and Communication Society, Vol. 84, No. 9, pp. 656–662, 2001), it is reported that substitution of hydrogen atoms contained in the resin material with other atoms makes the resin material able to deal with optical communication in the IR region although this is not practical.

Further, as the optical part using the IR transmissive resin material, for example, an optical transmission body obtained by substituting hydrogen atoms contained in an organic polymer, which forms the core part having an initial transmission loss of 0.4 dB or lower at 780 nm wavelength, with heavy hydrogen atoms or fluorine atoms is proposed in Japanese Patent No. 2,854,669. Also, a flat type plastic optical waveguide using heavy hydrogenated or halogenated polyacrylate, polysiloxane, or polystyrene is proposed in Japanese Patent No. 2,599,497.

On the other hand, a variety of optical parts using resin materials, for example, in production of optical fibers, are produced by spinning. Further, in the case of optical waveguide production, for example, the Japanese Patent No. 2,854,669 discloses a production method by injection molding a core part and casting a clad part and Japanese Patent No. 2,599,497 discloses a production method, which combines photolithography and dry etching.

However, the spinning method can produce only fiber-shapes, and can not produce optical parts with complicated shapes other than fibers, such as a connector, an optical waveguide and the like. Also, although the injection molding and casting can produce optical parts with various shapes it is difficult to produce optical parts having fine and precise patterns using injection molding and casting.

Meanwhile, the method comprising a combination of photolithography with dry etching and/or wet etching, it is possible to produce optical parts having fine and precise patterns. However, this method has the following problems: (1) the production steps are complicated and consequently the productivity is low; (2) wastes (resist, alkaline waste liquid, and the like) generated in a series of the production process are harmful and large in quantity, so that the damage to environments is large and disposal treatment cost of the waste is high; and (3) attributed to the facts (1) and (2), the production cost is high.

On the other hand, the present inventors have proposed image formation methods excellent in resolution and production methods of color filters using electrodeposition materials including coloring materials by electrodeposition by low voltage application or photoelectrodeposition in Japanese Patent Application Laid-Open (JP-A) Nos. 10-119,414, 11-189,899, 11-174,790, 11-133,224, and 11-335,894. These image formation method and color filter formation method can be characterized in that colored films with high resolution can be easily formed, however they are techniques to be applied mainly in the field of display apparatus such as liquid crystal displays.

As compared with the method involving photolithography in combination with dry etching or wet etching, the above-mentioned electrodeposition methods are capable of easily forming fine patterns at high productivity while only generating harmful waste solution in slight amounts. However, producing optical parts of an optical waveguide or the like by an electrodeposition method has not been tried yet.

Further, an electrodepositive polymer material to be employed for a conventional electrodeposition method contains many hydrogen atoms, and thus is insufficient in the light transmissivity in a wavelength region of 700 nm to 1.35 μm, which is expected to become necessary in communication in wavelength range to be used for optical communication, especially in short distance communication in local areas.

SUMMARY OF THE INVENTION

The present invention aims to solve the above-mentioned problems. That is, the purpose of the present invention is to provide an electrodeposition solution capable of easily producing an optical part of an optical waveguide or the like with low transmission loss and high shape precision at high productivity by employing an electrodeposition method or a photoelectrodeposition method, which is capable of easily forming fine patterns while suppressing the amount of harmful waste liquid generated, an optical part produced by the electrodeposition solution, and a production method for the optical part.

The above-mentioned purpose can be achieved by providing an electrodeposition solution and an electrodeposition apparatus for an optical waveguide formation method. That is, the present invention provides the following.

One aspect of the present invention provides an electrodeposition solution comprising an electrodeposition material including at least an electrodepositive polymer material, which comprises hydrogen atoms, and capable of forming an electrodeposition film by depositing the electrodeposition material from the electrodeposition solution, wherein 10% to 90% of the hydrogen atoms are substituted by heavy hydrogen atoms and a transmission loss of the electrodeposition film to light in a wavelength region of 700 nm to 1,350 nm is no more than 1 dB/cm.

Further, the present invention provides the following.

Another aspect of the present invention provides an optical part comprising a light transmitting portion for transmitting information with light in a wavelength region of 700 nm to 1,350 nm, wherein the optical part is produced by a process of forming at least a portion of the light transmitting portion using an electrodeposition solution, which contains an electrodeposition material, by deposition of the electrodeposition material from the electrodeposition solution, the electrodeposition material contains at least an electrodepositive polymer material comprising hydrogen atoms, 10 to 90% of the hydrogen atoms are substituted by heavy hydrogen atoms and a transmission loss of the light transmitting portion to light in a wavelength region of 700 nm to 1,350 nm is no more than 1 dB/cm.

Further, the present invention provides the following.

Still another aspect of the present invention provides a production method for an optical part including a light transmitting portion for transmitting information with light in a wavelength region of 700 to 1350 nm, the method comprising the step of:

forming at least a portion of the light transmitting portion by depositing an electrodeposition material from an electrodeposition solution, wherein the electrodeposition material includes at least an eletrodepositive polymer material comprising hydrogen atoms, 10 to 90% of the hydrogen atoms are substituted by heavy hydrogen atoms, and a transmission loss of the light transmitting portion to light in a wavelength region of 700 to 1350 nm is no more than 1 dB/cm.

DESCRIPTION OF THE PREFERRED EMBODIMENTS

Figure 1:
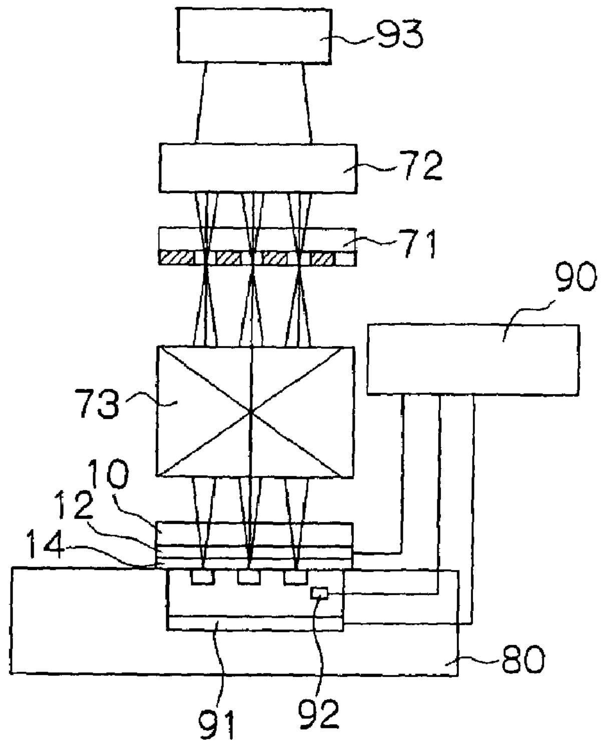
FIG. 1 is a conceptual view showing one example of an electrodeposition apparatus comprising a projection aligner to be used at the time of producing an optical waveguide.

Hereinafter, the present invention to be employed for formation of an optical part of an optical waveguide or the like will be described broadly in order of an electrodeposition solution, an electrodeposition method, an optical part of an optical waveguide or the like, and its production method.

(Electrodeposition Solution)

At first, a description will be given mainly of optical characteristics of an electrodeposition film formed by using an electrodeposition solution of the present invention and then a description mainly relevant to the electrodeposition solution and the matter other than the optical properties of the electrodeposition film formed using the electrodeposition solution will be given.

That is, the electrodeposition solution of the present invention comprises an electrodeposition material including at least an electrodepositive polymer material, which comprises hydrogen atoms, and is capable of forming an electrodeposition film by depositing the electrodeposition material from the electrodeposition solution, and in the electrodeposition solution, 10 to 90% of the hydrogen atoms are substituted by heavy hydrogen atoms and a transmission loss of the electrodeposition film to the light in a wavelength region of 700 nm to 1,350 nm is no more than 1 dB/cm.

The electrodeposition solution of the present invention can make it possible to easily carry out fine pattern formation while generating a harmful waste liquid in slight amounts and to easily produce an optical part of such as an optical waveguide or the like with a low transmission loss and a high precision at a high productivity by employing an electrodeposition method or a photoelectrodeposition method.

Substitution of 10 to 90% of hydrogen atoms composing the electrodepositive polymer material with heavy hydrogen atoms results in decrease of absorptivity of light in an infrared region attributed to hydrogen atoms. Therefore, the transmission loss of the electrodeposition film which is formed of an electrodeposition material including the electrodepositive polymer material to the light in a wavelength region of 700 nm to 1,350 nm can be no more than 1 dB/cm.

The above-mentioned transmission loss does not necessarily mean that the transmission loss is no more than 1 dB/cm to the light in the full wavelength region from 700 nm to 1,350 nm, in the case the light, just like laser beam, is limited in a narrow wavelength band. In the present invention, in the case the light to be used is laser light, it is sufficient that the transmission loss is no more than 1 dB/cm at least in a range of preferably ±5 nm, more preferably ±10 nm, around certain center wavelength λ in the above-mentioned wavelength range.

In the range of the wavelength of 700 nm to 1,350 nm, the light with the center wavelength λ is preferably light with wavelength of 1,300 nm or 1,350 nm, which has presently been used. Further, the light with wavelength range of 800 nm to 900 nm, which is supposed to be suitable for utilization of an optical material of an organic substance in the near future, is also preferred to be used.

In order to provide such optical characteristics, it is required to substitute 10% to 90% of hydrogen atoms composing the electrodepositive polymer material with heavy hydrogen atoms (hereinafter, the substitution of hydrogen atoms composing the molecule such as an electrodepositive polymer material and the like with heavy hydrogen atoms may be referred to as "heavy hydrogen atom substitution" for short and the ratio of such substitution may be referred to as "heavy hydrogen atom substitution ratio" for short). Incidentally, the heavy hydrogen atom substitution ratio means the mole ratio (%) of substituting heavy hydrogen atoms to all hydrogen atoms contained in the respective polymers composing the electrodepositive polymer material before the heavy hydrogen atom substitution.

In the case the heavy hydrogen atom substitution ratio of the hydrogen atoms composing the electrodepositive polymer material is lower than 10%, the optical characteristics as described above cannot be achieved.

On the other hand, if the heavy hydrogen atom substitution ratio is higher than 90%, there occur problems on the processibility and formability of the electrodeposition film and/or on various characteristics other than the optical characteristics of the electrodeposition film. Further, in some cases, production of an electrodepositive polymer material having such a heavy hydrogen atom substitution ratio becomes difficult.

The heavy hydrogen atom substitution ratio is preferably in a range of 20% to 60%, more preferably in a range of 30% to 40%, from a viewpoint of the above-mentioned optical characteristics of the electrodeposition film, various characteristics other than the optical characteristics, and the processibility and formability of the electrodeposition film.

In order to easily deposit and form the electrodeposition film having such described optical characteristics by an electrodeposition method, the foregoing electrodepositive polymer material is preferably a material having solubility or dispersibility in an aqueous liquid is decreased by change of pH. In order to satisfy such a condition, the foregoing electrodepositive polymer material preferably includes a copolymer obtained by polymerization of at least a hydrophobic monomer and a hydrophilic monomer. More detailed and desirable condition as the foregoing condition of the electrodepositive polymer material will be described later.

Further, in order to suppress the deterioration of film formability (adhesion strength to a substrate) of a formed electrodeposition film and the film quality deterioration after the electrodeposition film formation such as crack generation attributed to alteration of temperature and humidity, the foregoing electrodepositive polymer material preferably includes a copolymer obtained by polymerization of at least a hydrophobic monomer, a hydrophilic monomer, and a plastic monomer.

Specific examples of the above-mentioned hydrophobic monomer, hydrophilic monomer, and plastic monomer and their desirable characteristics will be described later.

The electrodepositive polymer material to be used in the present invention is not particularly limited if it is subjected to the heavy hydrogen atom substitution as described above, however the electrodepositive polymer material preferably includes a copolymer obtained by polymerization of at least one or more kinds of monomers in which hydrogen atom composing the monomers contained in the electrodepositive polymer material is substituted by a heavy hydrogen atom.

That is, in the synthesis process of the electrodepositive polymer material comprising a series of steps of synthesizing or preparing monomers, which are starting raw materials, and polymerizing the monomers, the electrodepositive polymer material can be produced by using monomers previously subjected to heavy hydrogen atom substitution.

Incidentally, in the case of synthesizing the electrodepositive polymer material by the method as described above-mentioned, the ratio of the monomer previously subjected to heavy hydrogen atom substitution to the monomers to be used and the heavy hydrogen atom substitution ratio of the heavy hydrogen atom-substituted monomer are not particularly limited.

However, it is required to properly select both so as to keep the heavy hydrogen atom substitution ratio in a range of 10% to 90%, preferably in a range of 25% to 60%, in the electrodepositive polymer material including a copolymer produced by polymerization of at least one or more kinds of monomers among which at least one hydrogen atom composing a monomer is substituted by heavy hydrogen atom.

If the heavy hydrogen atom substitution ratio exceeds 60%, it could sometimes become difficult to synthesize the electrodepositive polymer material. For that, an innovative synthesis process from the starting raw materials is required and it results in considerable increase in number of the synthesis steps, prolongation of production time, and decrease of the productivity in some cases. On the other hand, in the case the heavy hydrogen atom substitution ratio is lower than 10%, the effect to improve the light transmission loss could become low.

Incidentally, other than the above-mentioned synthesis process, it is of course possible to obtain an electrodepositive polymer material to be used in the present invention through the synthesis process involving heavy hydrogen atom substitution of a copolymer obtained by polymerization of only monomers which are not subjected to heavy hydrogen atom substitution.

Whether the former synthesis process is employed or the latter synthesis process is employed can be selected depending on the necessity in consideration of various factors such as controllability of the heavy hydrogen atom substitution ratio, easiness of the polymerization, synthesis cost and the like.

From a viewpoint of the controllability of the heavy hydrogen atom substitution ratio of a finally synthesized electrodepositive polymer material and, easiness to understand the heavy hydrogen atom substitution ratio, the former synthesis process is preferred to be employed.

That is because, in the former synthesis process, a heavy hydrogen atom-substituted monomer in which the ratio of the heavy hydrogen atoms contained therein is known (hereinafter, referred to as heavy hydrogen atom-substituted monomer in some cases, for short) is used. Therefore, the heavy hydrogen atom substitution ratio of the electrodepositive polymer material can easily calculated from the heavy hydrogen atom substitution ratio of the heavy hydrogen atom-substituted monomer and the ratio of the heavy hydrogen atom-substituted monomer in the entire monomers used for the synthesis. Further, the heavy hydrogen atom substitution ratio in the electrodepositive polymer material can easily controlled by adjusting the values of both.

As compared with an electrodepositive polymer material which is not at all subjected to the heavy hydrogen atom substitution (hereinafter, referred to as unsubstituted electrodepositive material in some cases, for short), an electrodepositive polymer material which is subjected to the heavy hydrogen atom substitution (hereinafter, referred to as substituted electrodepositive material in some cases, for short) tends to have approximately the same or close characteristics other than the transmission loss in the case the molecular structures of both are substantially identical.

On the other hand, in the case of designing a conventional optical part of such as an optical waveguide, it is required to determine the combinations of materials in consideration of the optical characteristics and various characteristics other than the optical characteristics at the time of selecting the materials to be used for a core layer and a clad layer. For example, in order to prevent occurrence of cracking due to thermal shock or temperature change, it is required for the materials use for the core layer and the clad layer to have thermal expansion coefficients with little difference between them. That is, in a conventional designing of an optical part, it is sometimes difficult to satisfy both of the required optical characteristics and characteristics other than the optical characteristics.

However, in the case of producing an optical part of such as an optical waveguide by using a substituted electrodeposition material and an unsubstituted electrodeposition material which have substantially identical molecular structures, the former for a core layer and the latter a clad layer, respectively, both have little difference in the thermal expansion coefficient, so that occurrence of cracking can easily be prevented.

In the case of designing an optical part using the substituted electrodeposition material and the unsubstituted electrodeposition material in combination as described above, since no mismatch and trade off in various characteristics other than the transmission loss can be suppressed between the utilized optical materials, the designing and optimization of the optical part is made easier than before.

Further, in the case of using a substituted electrodeposition material and an unsubstituted electrodeposition material with molecular structures substantially identical or similar to each other in combination, since the characteristics other than the transmission loss are closed between both, the durability of the electrodeposition film can be improved and further the durability of the optical part of such as an optical waveguide produced using the electrodeposition film can be improved. Further, since the refractive index of the electrodeposition film formed using the substituted electrodeposition material can be improved, the electrodeposition film can be applied to many other uses and purposes as an optical member used in the case of producing an optical part. Further, use of the substituted electrodeposition material makes it possible to form a fine pattern of an optical part of such as an optical waveguide at a high precision and to provide an optical part excellent in optical characteristics and with a high integration degree. That is, since a fine pattern with a higher precision can be formed, the optical part can be miniaturized and the transmission loss depending on the precision of formed fine pattern can be suppressed to low.

Incidentally, in order to form a fine pattern with a high precision and form another layer further on the surface of an electrodeposition film, the surface energy of the electrodeposition film is undesired to be too high or too low and preferred to be in a range of about 27 to 53 dyn/cm.

If the surface energy of the electrodeposition film is less than 27 dyn/cm, there occur problems that the patterning precision is lowered; the adhesion strength between the surface of the electrodeposition film and a film to be layered on the surface is decreased; and that the electrodeposition film surface easily becomes uneven. Meanwhile, if the surface energy of the electrodeposition film is higher than 53 dyn/cm, the patterning precision may be decreased in some cases.

However, in the electrodeposition film produced by using the electrodeposition solution of the present invention, the surface energy can be prevented from becoming too low or too high, and it can be easily adjusted in a range of 27 to 53 dyn/cm, so that the problems as described above can be avoided.

Next, description will be given mainly of the electrodeposition solution and the matter relevant to characteristics other than optical characteristics of the electrodeposition film formed by using the electrodeposition solution.

As described already, in order to make formation of the electrodeposition film by an electrodeposition method easy, the foregoing electrodepositive polymer material is preferably a material having solubility and dispersibility in an aqueous liquid deteriorated by change of pH.

In the present invention, as the electrodepositive polymer material, as described already, it is important for the electrodepositive polymer material to include a copolymer obtained by polymerization of monomers having different characteristics one another, that is, at least a hydrophilic monomer and a hydrophobic monomer. Further, the electrodepositive polymer material to be used in the present invention is more preferred to include a copolymer obtained by use of the foregoing two different types of monomers and, preferably, a plastic monomer, that is, polymerization of at least a hydrophilic monomer, a hydrophobic monomer, and a plastic monomer.

Due to existence of such a copolymer in the foregoing electrodepositive polymer material, at first an easily soluble property in a water-based medium can be assured owing to the function of the hydrophilic monomer unit, secondly the electrodeposition film excellent in water-proofness based on the intense cohesive force can be formed quickly owing to the function of the hydrophobic monomer unit, and thirdly, the film formability (adhesion property) to a material to be electrodeposited can be improved owing to the plastic monomer unit and a film with a uniform film thickness and coloration density and a smooth surface can be formed by voltage application at a low potential and film quality deterioration such as cracking after film formation (drying) can be avoided.

In the case the electrodepositive polymer material includes a copolymer obtained by polymerization of at least a hydrophilic monomer and a hydrophobic monomer, the composition ratio of the hydrophilic monomer or the hydrophobic monomer composing the copolymer (the ratio (%) of the number of the hydrophilic monomer or the hydrophobic monomer to the total number of the monomers used for the copolymerization) is preferably in the following range. By controlling the composition ratio of the hydrophilic monomer or the hydrophobic monomer composing the copolymer to be in the following range, the deposition efficiency of the electrodepositive polymer material contained in the electrodeposition solution is especially increased by pH change and therefore, the electrodepositive polymer material can be easily deposited on a substrate even at a low potential and the stability of the electrodeposition solution can be assured.

That is, the composition ratio of the hydrophilic monomer composing the copolymer is preferably 10 to 70%, more preferably 15 to 45% in terms of assurance of sufficient solubility or dispersibility in an aqueous liquid (including an aqueous liquid with controlled pH).

If the composition ratio of the foregoing hydrophilic monomer is less than 10%, the solubility of the electrodepositive polymer material in water could be too low and therefore the copolymer could not be dissolved in water in some cases. On the other hand, if the composition ratio of the foregoing hydrophilic monomer exceeds 70%, the electrodepositive polymer material could be too easily changed to be water-insoluble from water-soluble by pH change or, on the contrary, too easily changed reversibly and therefore, the deposited electrodepositive polymer material could be redissolved in the electrodeposition solution in some cases.

The composition ratio of the hydrophobic monomer composing the copolymer is preferably 25 to 70%, more preferably 30 to 60%.

If the composition ratio of the hydrophobic monomer is less than 25%, the water-proofness and the film strength of the electrodeposition film could become insufficient in some cases. On the other hand, if the composition ratio of the hydrophobic monomer exceeds 70%, the affinity of the copolymer to a water-based solvent could be decreased, so that a sufficient amount of the electrodepositive polymer material could not be dissolved in the electrodeposition solution or the electrodepositive polymer material could be precipitated in the electrodeposition solution or the viscosity of the electrodeposition solution could sometimes become too high to form a uniform film.

Meanwhile, if the composition ratio of the hydrophobic monomer is in the foregoing range, the affinity of the electrodepositive polymer material to a water-based solvent is high and the stability of the electrodeposition solution is increased and the electrodeposition efficiency is high and therefore, it is preferred.

Accordingly, in terms of the above described sharp change in the state by pH change and high hydrophilicity, a copolymer including styrene and its derivative and (meth) acrylic acid and its derivative as monomers composing the copolymer is especially preferred.

In the case the electrodepositive polymer material includes a copolymer obtained by polymerization of at least a hydrophilic monomer, a hydrophobic monomer, and a plastic monomer, the composition ratio of the hydrophilic monomer, the hydrophobic monomer, or the plastic monomer composing the copolymer (the ratio (%) of the number of the hydrophilic monomer, the hydrophobic monomer, or the plastic monomer to the total number of the monomers used for the copolymer) is preferably in the following range.

If the composition ratio of the hydrophilic monomer, the hydrophobic monomer, or the plastic monomer composing the copolymer is in the following range, the deposition efficiency of the electrodepositive polymer material contained in the electrodeposition solution by pH change is especially high and therefore, the electrodepositive polymer material can be easily deposited on a substrate even at a low potential and the stability of the electrodeposition solution can be assured and further a film deposition characteristic (hysteresis property) to form a uniform film can be obtained and excellent film quality hardly causing cracks or the like can be obtained.

That is, the composition ratio of the hydrophilic monomer composing the copolymer is preferably 10 to 30%, more preferably 13 to 20% in terms of assurance of sufficient solubility or dispersibility in an aqueous liquid (including an aqueous liquid with controlled pH).

If the composition ratio of the foregoing hydrophilic monomer is less than 10%, the solubility of the electrodepositive polymer material in water could be too low and therefore the electrodepositive polymer material could not be dissolved in water in some cases. On the other hand, if the composition ratio of the foregoing hydrophilic monomer exceeds 30%, the electrodepositive polymer material could be too easily changed to be water-insoluble from water-soluble by pH change or, on the contrary, too easily changed reversibly and therefore, the deposited electrodepositive polymer material could be redissolved in the electrodeposition solution in some cases.

The composition ratio of the hydrophobic monomer composing the copolymer is preferably 15 to 45%, more preferably 25 to 39%.

If the composition ratio of the hydrophobic monomer is less than 15%, the water-proofness and the film strength of the electrodeposition film could become insufficient in some cases. On the other hand, if the composition ratio of the hydrophobic monomer exceeds 45%, the affinity of the copolymer to a water-based solvent is decreased, so that a sufficient amount of the electrodepositive polymer material could not be dissolved in the electrodeposition solution or the electrodepositive polymer material could be precipitated in the electrodeposition solution or the viscosity of the electrodeposition solution could sometimes become too high to form a uniform film.

Meanwhile, if the composition ratio of the hydrophobic monomer is in the foregoing range, the affinity of the electrodepositive polymer material to a water-based solvent could be high and the stability of the electrodeposition solution could be increased and the electrodeposition efficiency could be high and therefore, it is preferred.

Further, the composition ratio of the plastic monomer affects generation of cracks (crevices) in a formed electrodeposition film. Therefore, the composition ratio of the plastic monomer is preferably 30 to 70%, more preferably 40 to 58%, in terms of improvement of the deposition and adhesion property to a material to be electrodeposited to improve the film formability and film quality modification (softening) after drying the electrodeposition film.

If the composition ratio of the plastic monomer is less than 30%, the film formability could be deteriorated to make it impossible to form a uniform film at a low potential or cracks (crevices of a film) are generated after the film formation (drying) to lead to film quality deterioration. On the other hand, if the composition ratio of the plastic monomer exceeds 70%, the mechanical strength of a film could become insufficient in some cases or the shape of an edge part of the film sometimes could become dull.

As described above, from a viewpoint that the electrodeposition film is provided with softness and cracking (crevice formation) after film formation (after drying) is avoided, the glass transition point (Tg) of the foregoing copolymer is preferably 5 to 150° C., more preferably 35 to 70° C.

Incidentally, the foregoing Tg value can be adjusted by mutually changing the melting point and copolymerization ratio of the plastic monomer. For example, depending on the molecular weight, the copolymerization ratio of the plastic monomer may be changed.

If the foregoing Tg value is less than 5° C., the mechanical strength and heat resistance of a film could sometimes become insufficient or an edge part could become dull in the shape. On the other hand, if the foregoing Tg value exceeds 150° C., cracking could easily take place in the film to make it impossible to assure a prescribed film quality.

The weight average molecular weight of the foregoing copolymer is preferably 6,000 to 30,000, more preferably 13,000 to 22,000, from a viewpoint that the various characteristics (e.g. the film thickness, the surface smoothness, and the like) of the film and the adhesion strength of the film can be made better.

If the weight average molecular weight is less than 6,000, the deposition amount of the electrodeposition material could sometimes be slight and the deposited electrodeposition material could become easy to be re-dissolved in the electrodeposition solution to result in unevenness of the film in some cases. On the other hand, if the weight average molecular weight exceeds 30,000, cracks (crevices and the like) are formed in the electrodeposition film and the electrodeposition film could be powdered to make it impossible to obtain the electrodeposition film with a high solidness in some cases.

Further, in the case the foregoing copolymer has a flow starting point of 180° C. or lower and a decomposition point of 150° C. or higher, preferably 220° C. or higher, the various characteristics of the electrodeposition film formed on a substrate could become excellent and hardly deteriorated by electrodeposition carried out thereafter and therefore it is preferred.

Further, the foregoing copolymer is preferably heat resistant. Specifically, the foregoing copolymer preferably has a weight decrease ratio in 10% or lower after heating treatment at 200° C. for 30 minutes and more preferably has a weight decrease ratio in 5% or lower after heating treatment at 250° C. for 30 minutes.

The balance of the hydrophobicity and hydrophilicity which the copolymer is required to have can be expressed by, for example, the numbers of the hydrophobic monomers and hydrophilic monomers to be copolymerized with each other, however in the case the copolymer is an anionic polymer, it can be expressed by acid value.

The acid value of the copolymer is preferably 60 to 160, more preferably 90 to 145, since the electrodeposition characteristics can be made better. If the acid value of the copolymer is less than 60, the affinity of the electrodepositive polymer material to a water-based solvent could be decreased, so that the electrodepositive polymer material could be precipitated in the electrodeposition solution or the viscosity of the electrodeposition solution could sometimes become too high to form a uniform film. Meanwhile, if the acid value of the copolymer exceeds 160, the water-proofness of the formed electrodeposition film could be deteriorated and the electrodeposition efficiency could be lowered.

The copolymer according to the present invention may be anionic molecule having an anion-dissociable group (e.g. carboxyl group or the like) or cationic molecule having a cation-dissociable group (e.g. amino group, imino group or the like). Which should be selected may be determined based on the solubility alteration characteristic responding to the change of pH which the electrodepositive polymer material has.

Among the foregoing copolymers, in the present invention, a copolymer obtained by polymerization using a carboxyl group-including hydrophilic monomer is preferred.

For example, with respect to a carboxyl group-including electrodepositive polymer material, in the case pH is in an alkalinity region, carboxyl group is put in dissociated state and so that, the electrodepositive polymer material is dissolved in an aqueous liquid and in the case pH is in an acid region, the dissociation state of carboxyl group disappears to result in decrease of the solubility and deposition of the electrodepositive polymer material. Further, the existence of the hydrophobic monomer contained in the copolymer provides the electrodepositive polymer material with a function of depositing a film at once in cooperation with the loss of ionic property of the ion-dissociated group by the above-mentioned pH change.

The copolymer according to the present invention may be any of a block copolymer, a random copolymer, a graft copolymer, and their mixture, however it is preferably a random copolymer or a block copolymer.

As the hydrophilic monomer composing the copolymer is preferably a monomer ion dissociable in an aqueous liquid (including an aqueous liquid with controlled pH), having sufficient solubility or dispersibility, comprising at least an ion-dissociable hydrophilic group in the molecule, and as a whole exhibiting hydrophilicity.

A specific characteristic of the hydrophilic monomer molecular structure is that the monomer molecule indispensably comprises an ion-dissociable hydrophilic group. As such a hydrophilic group, carboxyl, hydroxyl, sulfonic acid groups and the like can be exemplified.

Specific examples of the hydrophilic monomer include acrylic acid and its derivatives, methacrylic acid and its derivatives, maleic anhydride and its derivatives, fumaric acid and its derivatives, crotonic acid and its derivatives, cinnamic acid and its derivatives, phthalic acid and its derivatives, and the like, having carbon atoms in number of preferably 2 to 15, more preferably 3 to 8. It is sufficient for the copolymer to contain at least one kind of the above exemplified hydrophilic monomers in copolymerized state and the copolymer may contain two or more of them in copolymerized state.

More specifically, as a hydrophilic monomer having an anion-dissociable group, monomers having a carboxyl group such as methacrylic acid, acrylic acid, maleic anhydride, propionic acid, fumaric acid, itaconic acid, and monomers including their derivatives can be exemplified. Among these hydrophilic monomers, methacrylic acid, acrylic acid, and monomers including their derivatives are preferred since the state change of an ionic molecule (a copolymer) including such monomers by change of pH can be sharp and the affinity to a water-based liquid can be increased.

Incidentally, as described above these hydrophilic monomers may be monomers of which at least one hydrogen atom in the molecule is substituted by heavy hydrogen atom.

The hydrophobic monomer composing the copolymer has a characteristic of changing the solubility of a copolymer due to change of hydrogen ion concentration (pH) and providing the copolymer with water-insolubility. The hydrophobic monomer is preferred to indispensably contain a hydrophobic group in the molecule and show hydrophobicity as a whole.

The specific characteristic of the molecular structure of the hydrophobic monomer is that a hydrophobic group indispensably exists in the molecule. Such a hydrophobic group is not particularly limited if the group exhibits hydrophobicity and aromatic hydrocarbon groups or non-polar or slightly polar atomic groups such as chain hydrocarbon groups can be exemplified.

As the hydrophobic monomer, aliphatic hydrocarbon and aromatic hydrocarbon having polymerizable double bonds (double bonds possible to polymerize groups) can be exemplified. As such a hydrophobic monomer, alkenes, dienes, styrene and their derivatives having carbon atoms of preferably 4 to 20, more preferably 5 to 10 can be exemplified. It is sufficient that at least one kind of the above exemplified hydrophobic monomers is contained in copolymerized state and two or more of them may be contained in copolymerized state.

More specifically, as the above described hydrophobic monomer, for example, styrene, α-methylstyrene, α-ethylstyrene, and the like can be exemplified. Among these hydrophobic monomers, styrene and α-methylstyrene and their derivatives are preferred since they can provide a copolymer with high hydrophobics efficiency and high deposition efficiency and they are excellent in controllability at the time of copolymerizing them with a hydrophilic monomer.

Incidentally, as described above these hydrophobic monomers may be monomers of which at least one hydrogen atom in the molecule is substituted by heavy hydrogen atom. Also, as a copolymer obtained by polymerization of at least a hydrophilic monomer and a hydrophobic monomer, copolymers obtained by polymerization of styrene or its derivative with (meth)acrylic acid as monomers are preferred.

The plastic monomer composing a copolymer is a monomer, as described above, having characteristics of providing film formability of an electrodeposition film and suppressing film quality deterioration after electrodeposition film formation. Also, the plastic monomer is a monomer indispensably including a plastic group in the molecule.

The plastic monomer is preferred to have a glass transition point in a range of −125° C. to 50° C. being in form of its homopolymer. Further, the foregoing glass transition point is further preferred in a range of −80° C. to 25° C. since the electrodeposition film can be provided with plasticity to make the electrodeposition film scarcely cracked.

If the glass transition point is lower than −125° C., the electrodeposition film could be too soft in some cases. On the other hand, if the glass transition point exceeds 50° C., cracking could easily occur in the electrodeposition film including the electrodepositive polymer material obtained by copolymerization using the plastic monomer.

As a specific characteristic of the molecular structure of the plastic monomer, the plastic monomer preferably contains an ester group in the molecule, however the monomer is not limited to this and those which have the above-mentioned characteristics can be used without any particular limitations.

Specific examples of the plastic monomer include, for example, the above described monomers having ester groups and as such monomers including ester groups, for example, methacrylic acid esters, acrylic acid esters, maleic anhydride esters and their derivatives can be preferably exemplified. Especially, in the case the plastic monomer is a methacrylic acid ester, the number of carbon atoms in the ester is preferably in a range of 1 to 20, more preferably in a range of 2 to 10 and in the case of an acrylic acid ester, the number of carbon atoms in the ester is preferably in a range of 1 to 20, more preferably in a range of 2 to 9. Further, the copolymer may contain at least one kind of the above exemplified hydrophobic monomers in copolymerized state and also may contain two or more of them in copolymerized state.

In the case the plastic monomer is methacrylic acid esters and their derivatives, for example, ethyl methacrylate, butyl methacrylate and the like can be exemplified. Also, in the case the plastic monomer is acrylic acid esters and their derivatives, for example, methyl acrylate, ethyl acrylate, butyl acrylate, n-hexyl acrylate, 2-ethylhexyl acrylate and the like can be exemplified. Further, the plastic monomer is maleic anhydride esters or their derivatives, for example, methyl maleate, ethyl maleate and the like can be exemplified.

Incidentally, these plastic monomers may be monomers, as described above, of which at least one hydrogen atom in the molecule is substituted by heavy hydrogen atom.

Accordingly, from a viewpoint that sharp state change by change of pH and attainment of high hydrophilicity, copolymers including, as monomers composing the copolymers, styrene and its derivatives, (meth)acrylic acid and its derivatives, and ester group-including monomers are especially preferred.

The copolymer may be a copolymer obtained by further adding other monomers to the above-mentioned two or three kinds of monomers and polymerizing them.

As other monomers described above, monomers having cross-linking groups can be exemplified. The copolymer obtained by polymerization using additionally such a cross-linking group-including monomer is capable of cross-linking the respective electrodepositive polymers by heating treatment after electrodeposition film formation, so that the mechanical strength and the heat resistance of the formed electrodeposition film can be improved.

As the foregoing cross-linking group, epoxy group, block isocyanate group (including groups changeable into isocyanate group), cyclocarbonate group, melamine group and the like are exemplified.

Also, as the cross-linking group-including monomer, for example, glycidyl (meth)acrylate, (meth)acrylic acid azide, 2-[o-(1'-methylpropylidenamino)carboxyamino]ethyl methacrylate (trade name: Karenzu MO1-BN; produced by SHOWA DENKO K.K.), 4-((meth)acryloyloxymethyl)ethylene carbonate, (meth)acryloylmelamine and the like are exemplified. Although differing depending on the types of monomers used, generally, these cross-linking monomers are preferably added in a ratio of 1 to 20% by mole in the entire monomers to be used in the case of copolymerization of the electrodepositive polymer material.

Further, other than the above-mentioned monomers having the cross-linking groups, for example, a small amount of monomers for decreasing the plasticity such as methyl methacrylate or the like may be used in order to adjust the plasticity of the electrodeposition film. Incidentally, such other monomers are not limited to the examples and other monomers may be used as required besides those exemplified.

The refractive index of the electrodepositive polymer material including the above-mentioned copolymer and subjected to heavy hydrogen atom substitution is in a range of about 1.4 to 1.6 similarly to that of a common polymer material. Further, based on the necessity, by controlling the composition of the foregoing electrodepositive polymer material and adding fine particles to control the refractive index to the foregoing electrodepositive polymer material, the refractive index can be adjusted to be a desired value.

Such an electrodepositive polymer material having the characteristics as described above can be obtained by properly controlling the types of the hydrophilic group, the hydrophobic group, and the plastic group; the balance of the hydrophilic group and the hydrophobic group; the acid value; the molecular weight and the like. The electrodepositive polymer material to be contained in an electrodeposition solution of the present invention may contain the described materials in any optional combination unless the thin film formability is deteriorated and may be a mixture of same polar molecules just like a mixture of two or more anionic molecules or a mixture of different polar molecules just like a mixture of an anionic molecule and a cationic molecule.

Next, the content of the respective components contained in an electrodeposition solution will be described. The components composing the electrodeposition solution can be generally classified into three types; an electrodepositive polymer material just like the materials described above; a variety of additives other than the electrodepositive polymer material; and a solvent. Hereinafter, the contents of the electrodepositive polymer material and the solvent to be contained in the electrodeposition solution will be described. The contents of a variety of additives will be described later.

The content of the electrodepositive polymer material contained in the electrodeposition solution is preferably 0.3 to 25% by mass, more preferably 1.2 to 12% by mass. If the content is less than 0.3% by mass, the film formability could be decreased and become unstable and various characteristics of the film could be deteriorated, whereas if the content exceeds 25% by mass, the viscosity of the electrodeposition solution could be increased and a problem on supply of the electrodeposition solution in production process might be caused.

As a solvent, one or more kinds of solvent of water and/or a solvent soluble in water (hereinafter, sometimes referred to as water-soluble solvent for short) may be used. The content of these solvents contained in the electrodeposition solution is preferably 60 to 98% by mass, more preferably 75 to 95% by mass.

In the above-mentioned range, the content of water contained in the electrodeposition solution is preferably 25 to 83% by mass, more preferably 55 to 75% by mass. Also, the content of the water-soluble solvent contained in the electrodeposition solution is preferably 0.5 to 25% by mass, more preferably 2.2 to 7% by mass.

The above-mentioned water-soluble solvent means a liquid soluble in water and having a boiling point of 110° C. or higher and a vapor pressure of 100 mHg (13.33 K-Pa) at a room temperature (20° C.). More preferably, the solvent has a boiling point of 150° C. or higher and a vapor pressure of 60 mHg (8.0 K-Pa) at a room temperature (20° C.).

As such a water-soluble solvent, those which satisfy the above-mentioned conditions can be employed without any particular limitations and, for example, dimethylaminoethanol, ethylene glycol, diethylene glycol, polyethylene glycol, glycerin, ethyl cellosolve, methyl cellosolve, ethylene glycol monoethyl ether, ethylene glycol dimethyl ether and the like can be exemplified.

The electrodepositive polymer material includes those which are changeable in a range from the dissolved or dispersed state to the state forming precipitates while generating supernatant responding to the change of pH value of the electrodeposition solution dissolving them. Such state change is caused in a range of preferably 2.9 or less, more preferably 1.5 or less, calculated on the basis of the width of the pH value.

If the foregoing width of pH value is 2.9 or less, film deposition at a glance is made possible responding even sharp change of pH by electricity application. Also, the film formed by deposition of the electrodepositive polymer material from the electrodeposition solution is excellent in cohesive force and low speed of re-dissolution of the electrodepositive polymer material in the electrodeposition solution. If the foregoing pH value exceeds 2.9, it could be difficult to obtain a film with a sufficient thickness due to decrease of film formation speed or the water-proofness of the film could be insufficient in some cases.

The electrodeposition solution in which the foregoing electrodepositive polymer material is dissolved is preferred to have a characteristic that re-dissolution (of the electrodepositive polymer material once precipitated in the electrodeposition solution) is difficult other than the characteristic that state alteration of causing precipitation responding to pH value alteration sharply takes place. Such a characteristic is so-called hysteresis characteristic and means, for example, in the case of an anionic electrodepositive polymer material, that deposition of the electrodepositive polymer material is caused abruptly owing to the decrease of pH and even if pH is increased (for example on completion of the electrodeposition, that is, in the case the voltage application is stopped), re-dissolution of the electrodepositive polymer material does not occur intensely and thus the deposited state of the electrodepositive polymer material is kept for a prescribed period. On the other hand, an electrodepositive polymer material showing no hysteresis characteristic is easy to cause re-dissolution of an electrodeposition film once formed because the solubility of the electrodepositive polymer material is increased even following a slight increase of pH.

Further, before thin film formation, if the electrodeposition is carried out on the condition that the solubility of the electrodepositive polymer material is saturated, re-dissolution of the electrodepositive polymer material once deposited in form of a thin film hardly takes place. However, in a photoelectrodeposition material which will be described later, when thin film formation is carried out in an electrodeposition solution with a pH value adjusted so as to keep the solubility of the electrodepositive polymer material in unsaturated state even if a thin film is formed, the film starts re-dissolution soon after light radiation is stopped. Accordingly, thin film formation is preferred to be carried out using an electrodeposition solution adjusted so as to keep the solubility of the electrodepositive polymer in a saturated state and pH of the electrodeposition solution is required to be adjusted before the thin film formation using an acid or an alkali.

On the other hand, in the case a silicon-based electronic part such as a thin film transistor or the like exists on a substrate to be employed for the electrodeposition, it is difficult to use an inorganic alkaline agent as a pH adjusting agent for adjusting pH of the electrodeposition solution, e.g. a water-soluble sodium compound, lithium compound, or potassium compound. That is because such a pH adjusting agent could deteriorate the electronic element characteristics by reaction with the silicon material composing the electronic part.

Therefore, in such a case, as the pH adjusting agent, ammonium compounds such as quaternary ammonium-based compounds, tetraalkylammonium compounds and the like or saturated or unsaturated amines are preferred to be used. Such compounds do not cause any bad effect on the characteristics of the silicon-based electronic part such as a thin film transistor even if they exist in the electrodeposition solution.

As the foregoing ammonium-based compounds, for example, ammonia water, tetraethylammonium perchlorate, tetramethylammonium perchlorate, tetrapropylammonium perchlorate, triethylpropylammonium perchlorate, methyltriethylammonium hydroxide, tetremethylammonium hydroxide, tetraethylammonium hydroxide, and the like can be exemplified. Also as the foregoing amines, for example, methylaminoethanol, dimethylaminoethanol, ethylaminoethanol, ethylenediamine, propylenediamine, methylamine, dimethylamine, trimethylamine, monoethylamine, diethylamine, triethylamine, propylamine, dipropylamine, butylamine, pentylamine and the like can be exemplified. One kind of these pH adjusting agents may be used and two or more kinds of them may be used in combination.

Further, it is possible to cause a bad effect on a variety of materials on a substrate by concentration of an electrodeposition solution adhering to and remaining on the substrate after film formation. Therefore, during the time until completion of the production process (of an optical part) after formation of the electrodeposition film, the pH adjusting agent is preferred to be removed. In such a case, if a pH adjusting agent with a boiling point of 200° C. or lower is used, the pH adjusting agent can be easily removed by simple heating treatment. As such a pH adjusting agent, for example, organic material-based pH adjusting agents such as ammonium-based compounds, amine-based compounds, quaternary ammonium compounds and the like can be exemplified and their boiling point is preferably 200° C. or lower, more preferably in a range of 50° C. to 160° C. If the boiling point of an organic material-based pH adjusting agent is 50° C. or lower, the pH adjusting agent is easy to evaporate from a liquid (an electrodeposition solution), so that the pH stability of the electrodeposition solution could be inferior. Meanwhile, if the boiling point of an organic material-based pH adjusting agent is higher than 200° C., the pH adjusting agent removal could be difficult after completion of the electrodeposition film formation and the effect of pH adjusting agent removal could be decreased. Additionally, the heating temperature necessary for removal of the pH adjusting agent is increased and therefore the risk could become high in the pH adjusting agent removal process.

The concentration of the above-mentioned pH adjusting agent contained in an electrodeposition solution is preferably in a range of 5 m-mol/L to 50 mol/L, more preferably in a range of 20 m-mol/L to 5 mol/L, furthermore preferably in a range of 50 m-mol/L to 0.5 mol/L.

Next, the conductivity of an electrodeposition solution will be described. The conductivity of the electrodeposition solution is relevant to the electrodeposition quantity per unit time (the electrodeposition film formation speed) and as the conductivity becomes higher, the film thickness of an electrodeposition film adhering to a substrate in a prescribed time becomes thick. However, the electrodeposition quantity tends to be saturated with a conductivity of about 1 mS/cm.

In the case of taking the balance between the electrodeposition film formation speed and the controllability of the electrodeposition film formation into consideration, the conductivity of the electrodeposition solution is preferably in a range of 0.1 mS/cm to 100 mS/cm, more preferably in a range of 1 mS/cm to 15 mS/cm. If the conductivity of the electrodeposition solution is lower than 0.1 mS/cm, since sufficient electric current cannot be obtained, the electrodeposition film formation speed could be so slow to take a long time to form the electrodeposition film with a desired film thickness in some cases. Meanwhile, if it is higher than 100 mS/cm, the controllability of the electrodeposition quantity could sometimes be deteriorated.

In the case the conductivity of the electrodeposition solution is insufficient, the electrodeposition film formation speed can be controlled by adding ion which does not affect the electrodeposition, for example, $NH^{4+}$ ion and $Cl^-$ ion to the electrodeposition solution. Generally, in order to increase the conductivity of the electrodeposition solution, a supporting salt is added to the electrodeposition solution. As such a supporting salt, a supporting salt commonly used in electrochemistry may be utilized and an alkali metal salts such as NaCl, KCl, and the like, ammonium chloride, ammonium nitrate, and a tetraalkylammonium salt such as tetraethylammonium perchlorate ($Et_4NClO_4$) and the like can be employed.

The above-mentioned electrodepositive polymer material is suitable as a material for forming an optical part of such as an optical waveguide since it has optical characteristics as described above. Further, the electrodepositive polymer material does not absorb UV rays even in the state where it is dissolved in water to be an electrodeposition solution. Therefore, in the case of pattern formation by UV radiation to a photosemiconductor, UV rays can be radiated through the electrodeposition solution. Further, electrodeposition of the electrodepositive polymer material can be carried out at a low potential, the oxygen gas generated at the time of electrodeposition is in a small quantity. Therefore, at the time of electrodeposition, the generated oxygen gas in the electrodeposition solution does not grow to be large bubbles and an electrodeposition film with a desired pattern is made possible to be formed by photovoltaic force by the photosemiconductor while the smoothness of the film face of the formed film being maintained.

The electric potential at the time of electrodeposition is not particularly limited, however it is preferably 9 V or lower, more preferably 4 V or lower.

A material to be coated for the electrodeposition is preferably a conductive material or the material that a layer of a conductive material is formed on the face where an electrodeposition film of the material to be coated is to be formed and further preferably the foregoing conductive material works also as an anode.

Such a conductive material is not particularly limited if it has conductivity and for example, iron and its compound materials, nickel and its compound materials, zinc and its compound materials, copper and its compound materials, titanium and its compound materials, and chromium and its compound materials can be employed and other than materials including one kind of these materials, those including two or more kinds of the materials can be employed.

Next, formation of a core layer and a clad layer using an electrodepositive polymer material will be described. In this case, methods for generating difference of the refractive index between the core layer and the clad layer are as follows:

(1) as an electrodeposition solution for clad layer formation, an electrodeposition solution including an electrodepositive polymer material is used, whereas as an electrodeposition solution for core layer formation, an electrodeposition solution in which fine particles with a higher refractive index than that of the foregoing electrodepositive polymer are dispersed in addition to the foregoing electrodepositive polymer is used:

(2) as an electrodeposition solution for core layer formation, an electrodeposition solution including an electrodepositive polymer is used, whereas as an electrodeposition solution for clad layer formation, an electrodeposition solution in which fine particles with a lower refractive index than that of the foregoing electrodepositive polymer are dispersed in addition to the foregoing electrodepositive polymer is used:

(3) as an electrodeposition solution for core layer formation, an electrodeposition solution in which, in addition to an electrodepositive polymer, fine particles with a lower refractive index than that of the foregoing electrodepositive polymer are dispersed is used whereas as an electrodeposition solution for clad layer formation, an electrodeposition solution in which fine particles with a lower refractive index than that of the foregoing electrodepositive polymer are dispersed in addition to the foregoing electrodepositive polymer is used: and (4) as an electrodeposition solution for clad layer formation, an electrodeposition solution including an electrodepositive polymer is used, whereas as an electrodeposition solution for core layer formation, an electrodeposition solution including an electrodepositive polymer with a higher refractive index than that of the former electrodepositive polymer is used.

As described above, the refractive index difference between the core layer and the clad layer can be adjusted by properly using two types of electrodepositive polymer materials with different refractive indexes and/or an electrodepositive polymer material mixed with fine particles for refractive index adjustment.

Next, the fine particles to be added to the electrodeposition solutions for refractive index adjustment for the core layer and/or the clad layer will be described. The number average particle diameter of the foregoing fine particles is preferably 0.2 to 150 nm, more preferably 20 to 85 nm in terms of dispersibility to an electrodeposition solution and transparency of an electrodeposition film. If the number average particle diameter is smaller than 0.2 nm, the production cost could be high and stable quality could not be obtained in some cases. Meanwhile, if the number average particle diameter exceeds 150 nm (that is, 1/10 of 1.5 μm which is the longest wavelength band in the wavelength band to be employed for communication), depending on the wavelength region to be used, the transparency might be decreased and diffused reflection of light could be caused in the inside of an optical path to result in internal loss increase in some cases.

The addition amount of the fine particles to an electrodeposition solution is preferably in a range of 0.5 to 25% by mass, more preferably in a range of 1.2 to 6% by mass. If the addition amount of the fine particles to an electrodeposition solution is less than 0.5% by mass, the refractive index difference between the core layer and the clad layer could not be obtained in some cases. Meanwhile, if the addition amount of the fine particles to an electrodeposition solution is more than 2.5% by mass, the viscosity of electrodeposition solution mixed with the fine particles could be increased and the thixotropy could be high and there might occur problems on stirring property and uniformity of the electrodeposition solution and flow resistance in the case of transportation and supply of the electrodeposition solution at the time of electrodeposition.

As the fine particles with high refractive indexes to be added to the electrodeposition solution for core layer formation, titanium oxide, zinc oxide and the like can be exemplified and as the fine particles with low refractive indexes to be added to the electrodeposition solution for clad layer formation, fluorine compounds including, as a representative, magnesium fluoride can be exemplified.

Next, removal of an electrodeposition solution remaining on a substrate after an electrodeposition film formation will be described. Immediately after the electrodeposition film formation on a substrate, the unnecessary electrodeposition solution adheres to various points on the substrate. As an efficient means of sufficiently removing the unnecessary electrodeposition solution, washing out with a liquid can be employed. Especially, washing using a liquid which is transparent, highly safe and inert is effective. However, for execution of washing with a liquid immediately after the electrodeposition film formation, the electrodeposition film is a lack of physical and chemical strength immediately after the formation.

In order to solve such a problem, in the case of washing the electrodeposition solution remaining on the substrate, the washing liquid to be employed for the washing is preferred to have capability of washing out the remaining electrodeposition solution and at the same time capability of promoting solidification of the formed electrodeposition film. As such a washing liquid, the pH value of the washing liquid is preferably in a pH range in which deposition of the electrodepositive polymer material from the electrodeposition solution takes place. In this case, at the time of carrying out the washing, attributed to the contact of the electrodeposition film with the washing liquid, solidification of the electrodeposition film is promoted, whereas a coloring component in the remaining electrodeposition solution coagulates to lose the adhesion property and the remaining electrodeposition solution becomes easy to be washed out. The washing with the washing liquid is a remarkably effective means in a step of washing out of the unnecessary electrodeposition solution after the electrodeposition film formation. Accordingly, the pH value of in the inside of the electrodeposition film is lowered more than that at the time of electrodeposition film and becomes a value at which deposition is promoted more than that under the pH value at which the electrodepositive polymer starts depositing from the electrodeposition solution.

Accordingly, the electrodeposition film after the washing using such a washing liquid is provided with increased solidness and thus formation of finer patterns with high resolution is made possible. In order to further improve the washing effect and the curing effect of the electrodeposition film in the case of using the washing liquid, the pH value of the washing liquid is preferably set to be a value of 0.3 or more at which the electrodepositive polymer is easier to be deposited than the precipitation starting pH value at which the electrodepositive polymer starts depositing from the electrodeposition solution. On the other hand, in the case the pH value of the washing liquid is set to be a value of 1.5 or more at which the electrodepositive polymer material is difficult to be deposited than the deposition starting pH value, re-dissolution of the once formed electrodeposition film becomes significant.

(Electrodeposition Method)

Using an electrodeposition solution of the present invention as described above, by an electrodeposition method or a photoelectrodeposition method described in Japanese Patent Application Laid-Open Nos. 10-119,414, 189,899, 11-15,418, 11-174,790, 11-133,224, and 11-335,894, an electrodeposition film can be formed on a substrate. Accordingly, it is made possible to form an optical part of such as an optical waveguide or the like having desired optical characteristics.

The above-mentioned electrodeposition method is basically a method for forming a film by depositing a film forming material from an electrodeposition solution. As the electrodeposition solution, a water-based electrodeposition solution including a film forming material whose solubility or dispersibility in the aqueous liquid is decreased by pH value alteration by water electrolysis is employed. Further, the film is formed on a substrate comprising an insulating substrate and a patterned conductive thin film formed thereon. The film formation is carried out by applying voltage between the conductive thin film and an opposed electrode while the substrate being installed in an electrodeposition solution so as to bring at least the conductive thin film into contact with the electrodeposition solution and thus depositing the film forming material on the conductive thin film from the electrodeposition solution.

On the other hand, the photoelectrodeposition method is a method for forming a film by depositing a film forming material from an electrodeposition solution while utilizing the photovoltaic force generated in a photosemiconductive thin film. As the electrodeposition solution, a water-based electrodeposition solution including a film forming material whose solubility or dispersibility in the aqueous liquid is decreased due to pH value alteration is employed. Further, the film is formed on a substrate comprising an insulating substrate on which a conductive thin film and a photosemiconductive thin film are formed thereon in this order. The film formation is carried out by applying voltage between the photosemiconductive thin film in selected regions and an opposed electrode by radiating light to the selected regions of the photosemiconductive thin film while the substrate being installed in an electrodeposition solution so as to bring at least the photosemiconductive thin film into contact with the electrodeposition solution and thus depositing the film forming material on the selected regions of the conductive thin film from the electrodeposition solution.

By employing such a variety of electrodeposition methods and photoelectrodeposition methods, without applying voltage higher than 9 V, electrodeposition can be carried out at a low potential, preferably 4.5 V or lower, more preferably 3.5 V or lower. At the time of the electrodeposition film formation, since electric current to be applied to the electrodeposition solution is slight, oxygen gas generated in the electrodeposition solution during the electric current application is almost all dissolved in the electrodeposition solution. Accordingly, no foaming of the oxygen gas generated in the electrodeposition solution occurs during electrodeposition and therefore no foaming scratch is formed on the surface of the formed electrodeposition film to make it possible to obtain an electrodeposition film with high film quality. Further, a fine pattern can be formed precisely on the electrodeposition film formed in such a manner.

Further, in the case of a conventional pattern formation method using a photosensitive resin, the pattern formation of an optical waveguide is carried out by forming a thin film by a photosensitive resin film formed on a substrate in a manner that the precision of the film thickness of the film to be formed can be assured and after that, by subjecting the film to an exposure step and developing the film using a large quantity of an alkaline type developing solution. However such a conventional pattern formation method burdens the environments with heavy load since the alkaline solution used for the development all becomes a waste liquid and there are also problems relevant to the environments, techniques and cost such as the pattern precision, the complicated and tedious steps.

However, the electrodeposition method of the present invention can easily control the film thickness by adjusting the light radiation duration and the voltage application duration and further, no etching treatment using a developing agent for pattern formation is needed, so that the load on the environments is slight. Therefore, the electrodeposition method of the present invention is superior to the conventional technique in terms of all of environments, techniques, and cost.

Meanwhile, an element in which an electronic circuit and an optical circuit are hybridized in a substrate is tried to be produced. In such a case, the conventional method is probable to cause damage on a circuit formed prior at the time of etching for patterning a circuit formed next. However in a pattern formation method by the photoelectrodeposition method, since no etching step is required, such a problem can be also avoided.

As described so far, the method for forming a fine pattern by the above-mentioned electrodeposition method or photoelectrodeposition method using an electrodeposition solution of the present invention is easy and the load of the method on the environments is low. Accordingly, such a method is advantageous for production of optical parts of a variety of an optical waveguides, optical integrated circuits, optical wiring boards and the like to be employed in general optical and micro optical fields, optical communication and optical information processing fields where high precision and high productivity are required.

Incidentally, a substrate to be employed in the case of producing an element comprising both of an electronic circuit and an optical circuit formed on a substrate is not particularly limited and it may bear a variety of electronic circuits formed previously by processing semiconductors or the like in at least a face of the substrate where an electrodeposition film is to be formed. Alternatively, the substrate may be coated with a material capable of forming an electronic circuit, for example, a semiconductor material such as crystalline, microcrystalline, or amorphous type silicon materials; a metal material; and so forth in at least a face thereof where an electrodeposition film is to be formed.

Next, a case of electrodeposition film formation by a photoelectrodeposition method using an electrodeposition solution of the present invention will be described with reference to an example of a case of producing an optical waveguide by forming an electrodeposition film on a substrate.

As a substrate for optical waveguide production to be employed for the photoelectrodeposition method (hereinafter, sometimes referred to as substrate for optical waveguide production), an insulating substrate bearing a conductive thin film and a photosemiconductor thin film formed in this order is employed. As the insulating substrate, a glass substrate, a quartz substrate, a plastic film, an epoxy substrate, and the like may be employed and as the foregoing conductive thin film, ITO, indium oxide, nickel, aluminum and the like may be employed, and as the foregoing photosemiconductor thin film, which will be described in details later, for example, a titanium oxide thin film or the like may be used. Incidentally, at the time of forming a pattern on the electrodeposition film, in the case light is radiated to the photosemiconductor thin film through the insulating substrate, the insulating substrate and the conductive thin film are required to be light transmissive. However, in the case light radiation is carried out through an electrodeposition solution, they are not limited as so.

Incidentally, "selected region" mentioned above means not only a partial region of a substrate for optical waveguide production but also the entire face region in the case of producing an optical waveguide by the photoelectrodeposition method. For example, it means that in the case of forming a clad layer on the entire face of a substrate for optical waveguide production, light radiation is carried out to the entire face of the substrate for optical waveguide production or uniform bias voltage is applied to the entire face. By such a method a core layer and/or a clad layer can be formed on the substrate for optical waveguide production.

In the case a clad layer and a core layer are superposed and formed on a substrate by using an electrodeposition solution of the present invention, after a clad layer is formed using an electrodeposition solution for clad layer formation, a core layer may be formed thereon using an electrodeposition solution for core layer formation without drying the formed clad layer. It is of course possible to carry out the layer formation in reverse order.

Further, in the case of forming a laminate of a clad layer-a core layer-a clad layer, using a substrate on which a clad layer and a core layer are formed in this order as described above, another clad layer is formed on the core layer using an electrodeposition solution for formation of the latter clad layer without drying both of the previously formed clad layer and core layer.

Because the clad layer or the core layer after drying by removing water after photoelectrodeposition becomes insulative, another core layer or clad layer cannot be formed further on layers dried by the photoelectrodeposition method. However, owing to the above-mentioned process, the conductivity of the core layer or clad layer kept in un-dried state is made possible to be maintained, another layer formation on these layers is made possible.

In the case a clad layer and a core layer are laminated and formed by using an electrodeposition solution of the present invention, to form the clad layer on the entire face of a substrate, at first, using electrodeposition solution for clad layer formation, light is radiated to a selected region (the entire face) of a substrate for optical waveguide production or a substrate for electrodeposition film formation to form a clad layer. Next, without drying the formed clad layer, light is radiated to a selected region (the core layer formation region) using electrodeposition solution for core layer formation to form a core layer.

Further, it may be also possible that without drying the clad layer and the core layer formed in such a manner, light radiation or bias voltage application is carried out to the entire face of the substrate using electrodeposition solution for clad layer formation to form another clad layer on the core layer (in this case, a structure of a lower clad layer/a core layer/an upper clad layer is formed).

Further, in the case of forming the foregoing clad layer, it may be also possible that without radiating light, voltage exceeding the Schottky barrier a photosemiconductor thin film of a substrate for an optical waveguide production has is applied to form the clad layer by electrodeposition. In this method, an exposure step can be eliminated, so that the clad layer formation becomes easier.

Next, a photosemiconductor thin film to be employed for a photoelectrodeposition method will be described. As a photosemiconductor thin film to be employed for the photoelectrodeposition method, any photosemiconductor thin film can be used if it is a transparent semiconductor thin film capable of generating electromotive force by light radiation.

Specifically, as the foregoing semiconductor, one or more kinds of materials such as GaN, diamond, c-BN, SiC, ZnSe, $TiO_2$, ZnO and the like can be used. Among these materials, $TiO_2$ having light absorption only in a region of wavelength of 400 nm or shorter is preferred to be used.

As a method for forming a titanium oxide semiconductor thin film on a substrate, a thermal oxidation method, a sputtering method, an electron beam evaporation method (EB method), an ion plating method, a sol-gel method and the like are available. By employing these methods, a titanium oxide semiconductor thin film with excellent characteristics as an n-type semiconductor can be obtained.

However, in the case an optical waveguide is formed while being layered on a substrate with a low heat resistance, for example, a substrate on which a plastic film or TFT is formed, a film formation method which does not cause any bad effect on the plastic film or TFT should be selected.

Although the sol-gel method is capable of forming titanium oxide with high optical activity as a photosemiconductor, it requires sintering at around 500° C. Therefore, in the case the sol-gel method is employed as the film formation method, it is difficult to form a titanium oxide semiconductor film on a plastic film substrate having a heat resistance only up to about 200° C. or a substrate on which TFT impossible to be heated to 250° C. or higher is formed.

However, in the case of using a plastic film substrate as the substrate, as the film formation method for forming a titanium oxide semiconductor film, a sputtering method, especially a RF sputtering method is preferably employed. These film formation methods are capable of carrying out film formation at a low temperature, can carry out film formation at 200° C. or lower, and scarcely cause damages on a substrate.

In the case a substrate in which TFT is formed is used as the substrate, a laser annealing method or an electron beam heating method may be employed. Or, using a coating liquid for thin film formation in which a photocatalytic titanium oxide fine particle is dispersed (as such a coating liquid, commercialized products produced by TOTO Co., Ltd., Nippon Soda Co., Ltd. and the like are available), a lift-off method using a photoresist is employed to make the application of the methods for forming the titanium oxide thin film at a low temperature possible.

Further, to form an anatase type titanium oxide with high optical activity, an RF sputtering method is preferred to be employed as a film formation method. This method is capable of providing a relatively high photovoltaic force.

In order to obtain good characteristics, the thickness of the photosemiconductor thin film is preferably in a range of 0.05 μm to 3 μm. If the thickness of the photosemiconductor thin film is thinner than 0.05 μm, the light absorption easily becomes insufficient to make it impossible to obtain sufficient photocurrent. Meanwhile, if it exceeds 3 μm, film formability could be deteriorated just as cracks and the like could be generated in the electrodeposition film.

In the case a photosemiconductor thin film is of titanium oxide or zinc oxide, the surface of a substrate of titanium or zinc is oxidized, so that a photosemiconductor thin film can be formed on the surface of such metal substrates.

Next, a method for producing an optical waveguide using an electrodeposition method will be described. In this method, a substrate for optical waveguide production comprising an insulating substrate and a conductive thin film (or a patterned conductive thin film) formed thereon is employed. Also, as a water-based electrodeposition solution, an electrodeposition solution including a film forming material whose solubility or dispersibility in a water-based liquid is decreased by change of pH is employed. Formation of the electrodeposition film is carried out by applying voltage between the conductive thin film and an opposed electrode while the substrate for optical waveguide production being installed in an electrodeposition solution so as to bring at least the conductive thin film into contact with the electrodeposition solution and thus depositing the film forming material on the conductive thin film from the electrodeposition solution.

As the insulating substrate, substrates similar to those employed in the photoelectrodeposition method can be used. Further, the patterned conductive thin film can be formed by patterning a conductive thin film by a common method or exposing only a conductive part in a pattern by applying an insulating film on a conductive thin film while leaving necessary portions. Using such a substrate; a clad layer or a core layer can be formed by the electrodeposition method.

Next, an electrodeposition apparatus to be employed at the time of production by a photoelectrodeposition method or an electrodeposition method will be described.

In the photoelectrodeposition method, a method for radiating light selectively to a photosemiconductor thin film is not particularly limited and other than a method using a photomask, laser exposure can be exemplified, however in terms of precision and handling easiness, use of a photomask is preferred.

FIG. 1 is a conceptual view showing one example of an electrodeposition apparatus comprising a projection aligner to be used at the time of producing an optical waveguide. The electrodeposition apparatus shown in FIG. 1 is for producing an optical waveguide by a photoelectrodeposition method using a photomask.

The electrodeposition apparatus shown in FIG. 1 is provided with a light source for radiating UV rays 93, an image-focusing optical system comprising a first image-focusing optical lens 72 and a second image-focusing optical lens 73, a photomask 71 inserted between the first image-focusing optical lens and the second image-focusing optical lens, an electrodeposition bath 80, a means for applying voltage such as a potentiostat 90, an opposed electrode 91, and a reference electrode such as a saturated calomel electrode 92. The numeric character 10 denotes an insulating substrate, 12 denotes a conductive thin film, and 14 denotes a photosemiconductor thin film.

Further, in the foregoing electrodeposition apparatus, in place of the foregoing image-focusing system, a mirror-reflection optical system may be used. As shown in FIG. 1, a substrate for an optical waveguide production is disposed in the electrodeposition bath 80 containing an electrodeposition solution in the electrodeposition apparatus to be used. By using the projection optical system as described above, pattern exposure can be focused on the photosemiconductor thin film 14 and the resolution of the optical waveguide can be increased in a short exposure period.

Further, it is preferred to adjust the distance between the image-focusing optical lens of the foregoing image-focusing optical system and the light transmissive substrate face to be 1 mm to 50 cm in terms of handling easiness. Further, it is preferred that the focal depth of the image-focusing optical system is in a range of ±10 to ±100 μm in terms of precision and handling easiness.

Further, in the case the photomask and the photosemiconductor thin film are arranged closely to each other, it is no need to employ an electrodeposition apparatus comprising such an image-focusing optical system or mirror-reflection optical system as described and provided with an exposing function. In this case, light can be radiated by an electrodeposition apparatus provided with an exposure function of carrying out exposure by parallel light rays or exposure carrying out closely to the photomask. As the radiation light source, for example, a Hg—Xe evenly radiating light source may be employed.

Figure 2:
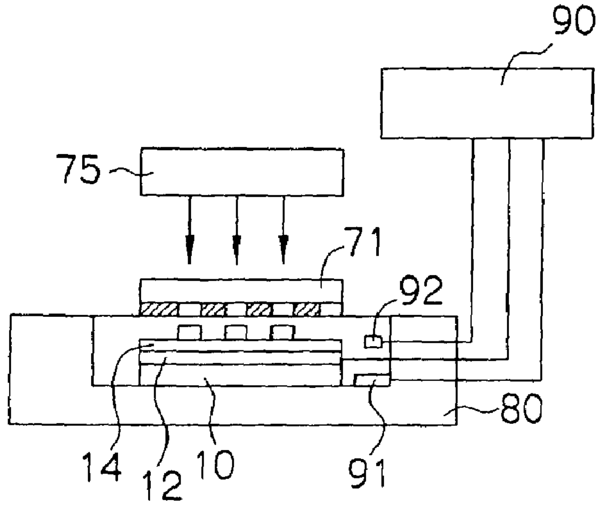
FIG. 2 is a conceptual view showing one example of an electrodeposition apparatus comprising a proximity aligner to be used at the time of producing an optical waveguide.

FIG. 2 is a conceptual view showing one example of an electrodeposition apparatus comprising a proximity aligner to be used at the time of producing an optical waveguide. In the electrodeposition apparatus shown in FIG. 2, a fine pattern formation is made possible by using the Hg—Xe evenly radiating light source 75, installing a photomask 71 disposing extremely closely to the surface of the electrodeposition solution filling an electrodeposition bath 80, and arranging a substrate for optical waveguide production in the vicinity of the photomask 71. In this case, the depth of the electrodeposition solution covering the substrate for optical waveguide production is desired as shallow as possible.

Besides, in the case of carrying out exposure of a photosemiconductor thin film through an insulating substrate, the thickness of the insulating substrate is adjusted to be 0.2 mm or thinner to prevent light diffraction and by carrying out exposure while the photomask is closely attached to the insulating substrate, a pattern with excellent resolution can be obtained. As the insulating substrate with a thickness of 0.2 mm or thinner, a plastic film is suitable to be used.

Of course, if it is no problem that the exposure period is long, light radiation can be carried out even by an economical scanning type laser writing apparatus.

Figure 3:
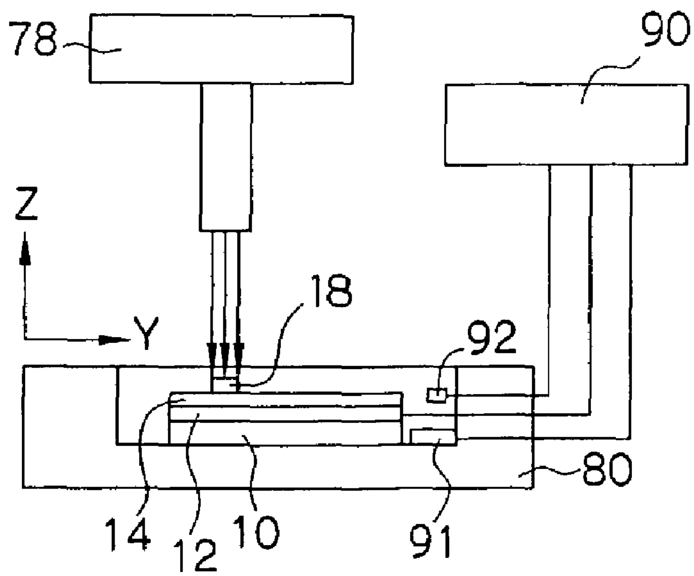
FIG. 3 is a conceptual view showing one example of an electrodeposition apparatus comprising a scanning laser aligner to be used at the time of producing an optical waveguide.

FIG. 3 is a conceptual view showing one example of an electrodeposition apparatus comprising a scanning laser aligner to be used at the time of producing an optical waveguide. The electrodeposition apparatus of FIG. 3 is capable of radiating light to a selected region by laser beam and is provided with a scanning laser writing apparatus 78 for laser light radiation such as He—Cd laser, an electrodeposition bath 80 containing an electrodeposition solution, a means for applying voltage such as a potentiostat 90, an opposed electrode 91, and a reference electrode such as a saturated calomel electrode 92. Also, in FIG. 3, the numeric character 18 denotes a core layer.

Besides them, if having a pattern resolution in an allowable range, a more economical proximity aligner may be used as the electrodeposition apparatus.

In the photoelectrodeposition method, exposure may be carried out from the insulating substrate side or from the photosemiconductor thin film side of a substrate for optical waveguide production or a film deposition substrate (substrate for electrodeposition film formation).

In the case of exposure from the photosemiconductor thin film side, the foregoing substrate is to be immersed in the electrodeposition solution. In this case, since the electrodeposition solution to be employed in the present invention does not absorb UV rays to be used as radiation light, exposure to the photosemiconductor thin film through the electrodeposition solution is made possible. FIG. 1 shows the case of carrying out exposure from the insulating substrate side and FIG. 2 and FIG. 3 show the case of carrying out exposure from the photosemiconductor thin film side.

Further, in the photoelectrodeposition method, in the case sufficient electromotive force for the electrodeposition is obtained by the photosemiconductor, it is no need to apply bias voltage by a voltage application apparatus.

Figure 4:
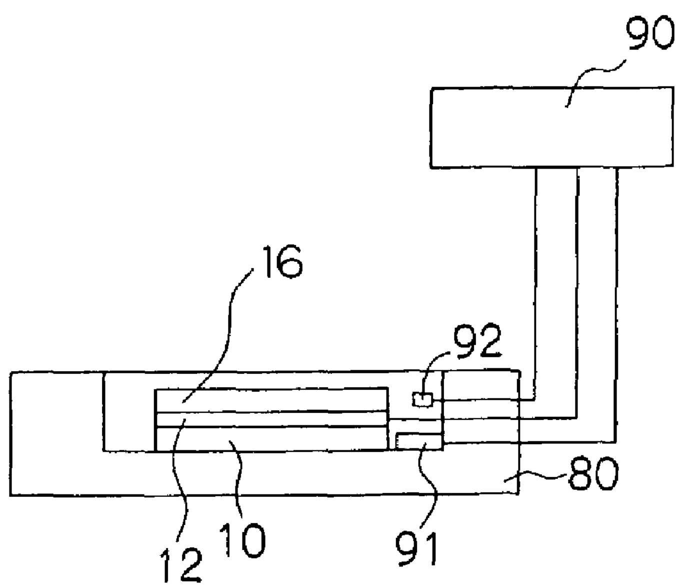
FIG. 4 is a conceptual view showing one example of an electrodeposition apparatus to be used at the time of producing an optical waveguide by electrodeposition.

Further, FIG. 4 is a conceptual view showing an electrodeposition apparatus to be used for producing an optical waveguide by an electrodeposition method. The electrodeposition apparatus is provided with an electrodeposition bath 80 containing an electrodeposition solution, a means for applying voltage such as a potentiostat 90, an opposed electrode 91, and a reference electrode such as a saturated calomel electrode 92. This figure shows the state where a clad layer 16 is formed on a conductive thin film 12 using a substrate for electrodeposition film comprising an insulating substrate 10 and the conductive thin film 12 formed on the entire surface of the substrate 10.

In the above described FIGS. 1 to 4; a voltage application apparatus (a means 90 for applying voltage) is joined to the conductive thin film 12, whereas in the photoelectrodeposition method, the photosemiconductor thin film 14 works as a working electrode.

(Optical Part of Optical Waveguide and its Production Method)

Next, an optical part for an optical waveguide or the like to be produced by an electrodeposition method or a photoelectrodeposition method using the above described electrodeposition solution of the present invention and its production method will be described below.

That is, the present invention provide an optical part comprising a light transmitting portion for transmitting information with light in a wavelength region of 700 nm to 1,350 nm, wherein the optical part is produced by a step of forming at least a portion of the light transmitting portion using an electrodeposition solution, which contains an electrodeposition material, by depositing the electrodeposition material from the electrodeposition solution, the foregoing electrodeposition material contains at least an electrodepositive polymer material comprising hydrogen atoms and 10 to 90% of the hydrogen atoms are substituted by heavy hydrogen atoms and a transmission loss of the light transmitting portion to light in a wavelength region of 700 nm to 1,350 nm is no more than 1 dB/cm, and a production method thereof.

Further, in the case of forming an optical part using an electrodeposition solution of the present invention, the foregoing optical part is preferably an optical waveguide. Also, the foregoing optical part is preferably a lens.

Incidentally, the light transmitting portion means only a portion where light is directly transmitted but not a portion contributing indirectly in terms of light transmission, for example, just like a clad layer, a part having a function of preventing leakage of light to be transmitted through a core layer. However, with respect to an optical part obtained accordingly to the present invention, if at least a portion of the light transmitting portion is formed using an electrodeposition solution of the present invention, other portions may be formed by using the electrodeposition solution of the present invention. Further, the optical part obtained according to the present invention may be combined with an electric part and/or a photoelectric conversion part such as a semiconductor circuit, a laser diode and the like.

Accordingly, with respect to the optical part of an optical waveguide obtained according to the present invention, the portion formed using the electrodeposition solution of the present invention has such optical characteristics as described above, so that the optical part can be used for information transmission especially using light in IR region.

Next, an optical part obtained according to the present invention and its production method will be described with reference to a case of producing an optical waveguide as an example by a photoelectrodeposition method. However, the present invention is not limited to the following examples.

Figure 5A:
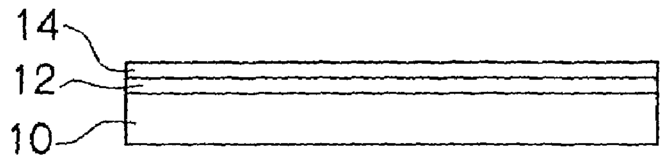
FIG. 5A is a schematical cross-sectional view showing one example of a substrate for optical waveguide production (a substrate composed of an insulating substrate 10, a conductive thin film 12, and a photosemiconductive thin film 14 in FIG. 5A).

FIG. 5 is a schematical cross-sectional view showing one example of an optical waveguide to be produced according to the present invention and the production steps and FIGS. 5A to 5D show the production steps of the optical waveguide in the case of forming a clad layer on the entire surface of a substrate. FIG. 5A shows one example of a substrate for optical waveguide production, and the numeral character 10 denotes an insulating substrate, 12 a conductive thin film, and 14 a photosemiconductive thin film.

Figure 5B:
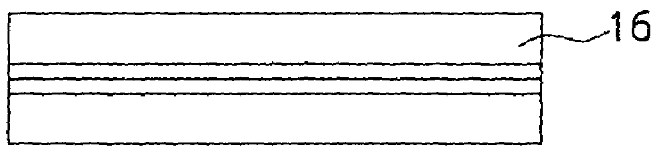
FIG. 5B is a schematical cross-sectional view showing the state where a clad layer 16 (not-yet-dried state) is formed on the photosemiconductive thin film 14 shown in FIG. 5A by full face light radiation or application of voltage exceeding the Schottky barrier which the photosemiconductive thin film has without radiating light using the electrodeposition solution for a clad layer.

FIG. 5B shows the state where a clad layer 16 (not-yet-dried state) is formed on the photosemiconductive thin film 14 using an electrodeposition solution for a clad layer by full face light radiation or application of voltage exceeding the Schottky barrier which the photosemiconductive thin film 14 has without radiating light.

Figure 5C:
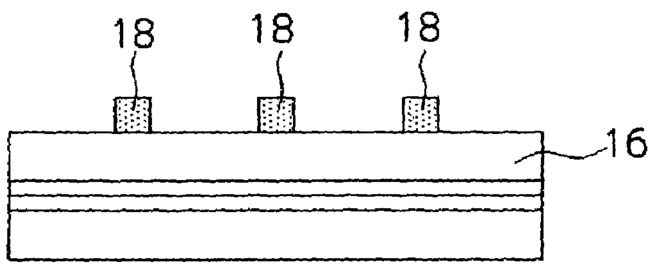
FIG. 5C is a schematical cross-sectional view showing the state where a clad layer 18 in not-yet-dried state is formed in a selected region on the clad layer 16 in not-yet-dried state shown in FIG. 5B by light radiation to the selected region using the electrodeposition solution for a core layer.
Figure 5D:
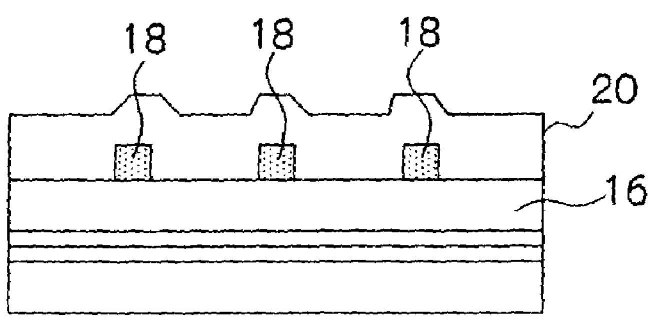
FIG. 5D is a schematical cross-sectional view showing the state where a clad layer 20 (not-yet-dried state) is formed on the core layer 18 in not-yet-dried state shown in FIG. 5C by full face light radiation or application of voltage exceeding the Schottky barrier which the photosemiconductive thin film 14 has without radiating light using the electrodeposition solution for a clad layer.

FIG. 5C shows the state where a clad layer 18 is formed in a selected region using an electrodeposition solution for a core layer by light radiation to the selected region on the clad layer 16 in not-yet-dried state. FIG. 5D shows the state where a clad layer 20 (not-yet-dried state) is formed on the core layer 18 in not-yet-dried state using an electrodeposition solution for a clad layer by full face light radiation or application of voltage exceeding the Schottky barrier which the photosemiconductive thin film 14 has without radiating light. After that, the respective layers are dried to obtain the optical waveguide. In such a manner, as shown in FIG. 5D, the optical waveguide can be produced.

Next, another optical waveguide to be produced according to the present invention and its production steps in the case that a clad layer is not formed in the entire face of a substrate for optical waveguide production will be described with reference to drawings.

Figure 6A:
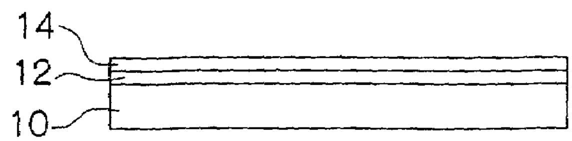
FIG. 6A is a schematical cross-sectional view showing another substrate for optical waveguide production similar to the substrate for optical waveguide production shown in FIG. 5A.
Figure 6B:
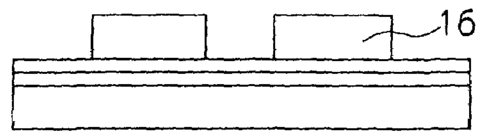
FIG. 6B is a schematical cross-sectional view showing the state where a lower clad layer 16 (not-yet-dried state) is formed in a selected region on the photosemiconductive thin film 14 shown in FIG. 6A by light radiation to the selected region using an electrodeposition solution for a clad layer.

FIG. 6 is a schematical cross-sectional view showing another example of an optical waveguide to be produced according to the present invention and the production steps and FIGS. 6A to 6E show the production steps of the optical waveguide in the case of forming a clad layer not on the entire surface of a substrate. FIG. 6A shows a substrate for an optical waveguide production similar to that of FIG. 5A. FIG. 6B shows the state where a lower clad layer 16 (not-yet-dried state) is formed on the photosemiconductive thin film 14 using an electrodeposition solution for a clad layer by light radiation to a selected region.

Figure 6C:
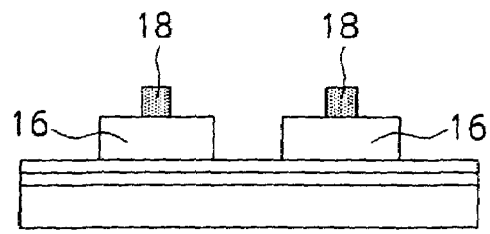
FIG. 6C is a schematical cross-sectional view showing the state where a core layer 18 is formed in a selected region on the lower clad layer 16 in not-yet-dried state as shown in FIG. 6B by light radiation to the selected region using the electrodeposition solution for a core layer.
Figure 6D:
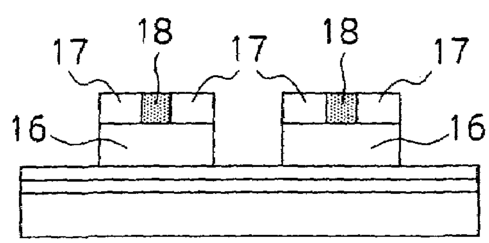
FIG. 6D is a schematical cross-sectional view showing the state where a side part clad layer 17 is formed on the side face of the core layer 18 in not-yet-dried state as shown in FIG. 6C by light radiation to a selected region using the electrodeposition solution for a clad layer.
Figure 6E:
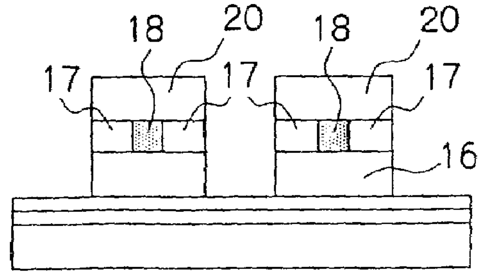
FIG. 6E is a schematical cross-sectional view showing the state where an upper clad layer 20 is formed on the clad layer 17 and the core layer 18 in not-yet-dried state shown in FIG. 6D by light radiation to a selected region using the electrodeposition solution for a clad layer.

FIG. 6C shows the state where a clad layer 18 is formed in a selected region using an electrodeposition solution for a core layer by light radiation to the selected region on the lower clad layer 16 in not-yet-dried state. Further, FIG. 6D shows the state where a side part clad layer 17 is formed on the side face of the core layer 18 in not-yet-dried state by light radiation to the selected region using the electrodeposition solution for a clad layer. Further, FIG. 6E shows the state where an upper clad layer 20 is formed using an electrodeposition solution for a clad layer on the clad layer 17 and the core layer 18 both in not-yet-dried state by light radiation to the selected region. In such a manner, the optical waveguide shown in FIG. 6E can be obtained.

In this case, it is possible to form photo-functional part such as an optical waveguide, a micro lens array in the portion where no clad layer exists in the substrate for optical waveguide production by further carrying out similar photoelectrodeposition process. The obtained optical waveguide has a high precision and the top part of the optical waveguide becomes flat. Therefore, a photo-functional part can be easily formed on the top part of such an optical waveguide with a high precision by carrying out another process.

Further, in the foregoing photoelectrodeposition method, as the substrate for optical waveguide production, a substrate obtained by forming a photosemiconductor thin film on a conductive substrate may be used. As the material of the conductive substrate, at least one kind of materials selected from iron and its compounds, nickel and its compounds, zinc and its compounds, copper and its compounds, titanium and its compounds, and their mixtures can be employed. As the conductive substrate, other than those material, a conductive plastic film may be also used.

Further, in the case a photosemiconductor is titanium oxide or zinc oxide, other than by a method that will be described later, a photosemiconductor thin film can be formed on the surface of a sheet of metal titanium or metal zinc by oxidizing the sheet. In this case, a substrate for optical waveguide production or a film deposition substrate (substrate for electrodeposition film formation) is composed of a conductive substrate and a photosemiconductor thin film formed thereon.

Since the oxidation treatment can be carried out by an economical method such as high temperature heating in air, anodization and the like, a light transmissive semiconductor thin film can be formed without using a costly sputtering method. Additionally, in the portion of an underlying metal substrate where oxidization is not carried out, it is preferred to form an insulating film in order to avoid formation of an unnecessary electrodeposition film.

Next, a method for producing an optical waveguide using an electrodeposition method will be described. In this method, a substrate for optical waveguide production comprising an insulating substrate bearing a conductive thin film or a patterned conductive thin film is employed. Also, as an electrodeposition solution, a water-based electrodeposition solution including a film forming material whose solubility or dispersibility in a water-based liquid is decreased by change of pH is employed. Formation of the electrodeposition film is carried out by applying voltage between the conductive thin film and an opposed electrode while the substrate for optical waveguide production being installed in an electrodeposition solution so as to bring at least the conductive thin film into contact with the electrodeposition solution and thus depositing the film forming material on the conductive thin film from the electrodeposition solution.

As the insulating substrate, substrates similar to those employed in the photoelectrodeposition method can be used. Further, the patterned conductive thin film can be formed by patterning a conductive thin film by a common method or exposing only a conductive part in a pattern by applying an insulating film on a conductive thin film while leaving necessary portions. Using a substrate obtained in such a manner; a clad layer or a core layer can be formed by the electrodeposition method.

Next, a method for transferring the optical waveguide produced as described above to another substrate will be described.

At first, a method for transferring the optical waveguide produced by the photoelectrodeposition method as described above to a substrate for optical waveguide production will be described. In this case, the optical waveguide produced by the photoelectrodeposition method, solely a core layer, solely a clad layer, or both clad layer and core layer can be transferred to another substrate. As the substrate to be used for the transfer, a substrate working also as a clad layer can be used.

By employing such a manner, the number of the total steps including the electrodeposition step can be lessened. However, in the case of separately forming the core layer and the clad layer by electrodeposition and repeating the transfer to produce an optical waveguide, since the transfer is repeated, the probability of loss of the interface between core layer and clad layer and the probability of deformation of the optical waveguide shape are slightly increased.

As the substrate for an optical waveguide, a commonly used glass substrate and epoxy resin substrate can be used and as the substrate for an optical waveguide which works also as a clad layer, a polyolefin film such as polyethylene, a polyester film, a polycarbonate film, an acrylic resin film, a fluorinated polymer film and the like can be used.

Next, an optical waveguide to be produced by utilizing the method for transferring the optical waveguide produced as described above to another substrate and its production steps will be described with reference to drawings.

FIG. 7 is a schematical cross-sectional view showing another example of an optical waveguide to be produced according to the present invention and the production steps and FIGS. 7A to 7F show the production steps of the optical waveguide by transferring once formed optical waveguide to another substrate.

Figure 7A:
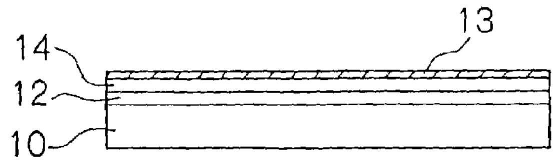
FIG. 7A is a schematical cross-sectional view showing another example of a substrate for electrodeposition film formation (a substrate composed of an insulating substrate 10, a conductive thin film 12, a photosemiconductive thin film 14, and a separation layer 13 in FIG. 7A).
Figure 7B:
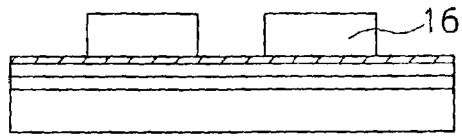
FIG. 7B is a schematical cross-sectional view showing the state where a lower clad layer 16 (not-yet-dried state) is formed in a selected region on the separation layer 13 shown in FIG. 7A by light radiation to the selected region using the electrodeposition solution for a clad layer.
Figure 7C:
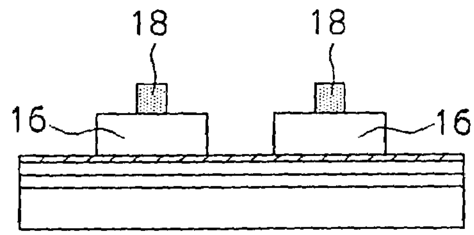
FIG. 7C is a schematical cross-sectional view showing the state where a core layer 18 is formed in a selected region on the lower clad layer 16 in not-yet-dried state as shown in FIG. 7B by light radiation to the selected region using the electrodeposition solution for a core layer.
Figure 7D:
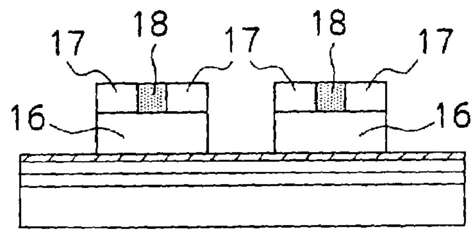
FIG. 7D is a schematical cross-sectional view showing the state where a side part clad layer 17 is formed on the side face of the core layer 18 in not-yet-dried state as shown in FIG. 7C by light radiation to a selected region using the electrodeposition solution for a clad layer.
Figure 7E:
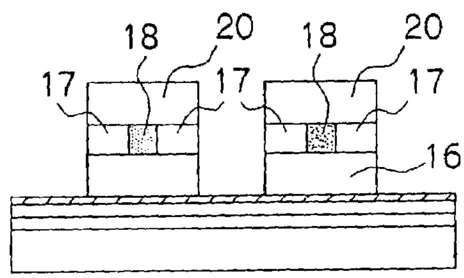
FIG. 7E is a schematical cross-sectional view showing the state where an upper clad layer 20 is formed on the clad layer 17 and the core layer 18 in not-yet-dried state shown in FIG. 7D by light radiation to a selected region using the electrodeposition solution for a clad layer.
Figure 7F:
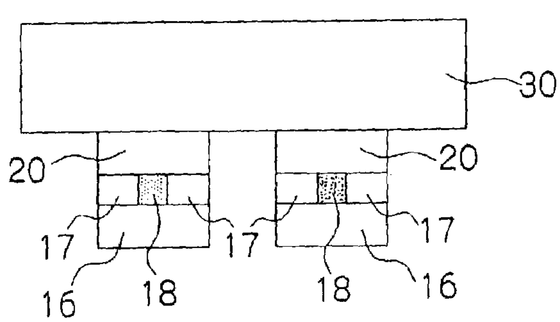
FIG. 7F is a schematical cross-sectional view showing the state where a substrate 30 is overlaid on the upper clad layer 20 shown in FIG. 7E and subjected to heating and pressurizing treatment and then the separation layer 13 and the lower clad layer 16 are detached from each other.

FIG. 7A is a drawing showing one example of a substrate for electrodeposition film formation and the numeral character 10 denotes an insulating substrate, 12 a conductive thin film, 14 a photosemiconductive thin film, and 13 a separation layer, respectively. Using the substrate for optical waveguide production, as described with respect to FIGS. 6B to 6E, a lower clad layer 16, a core layer 18, a side part clad layer 17, and an upper clad layer 20 (see FIGS. 7B to 7E) are formed. Then, a substrate 30 is overlaid on the upper clad layer 20 and subjected to heating and pressurizing treatment. After that, the separation layer 13 and the lower clad layer 16 are detached from each other to obtain the optical waveguide (see FIG. 7F). In such a manner, the optical waveguide as shown in FIG. 7F can be produced.

Further, a clad layer or a core layer formed by the electrodeposition method can be transferred to another substrate. In this case, it is advantageous to use a substrate having a function also as a clad layer for the substrate to be used for the transfer.

Next, the case that a core layer is formed by the electrodeposition method and it is transferred to a substrate having a function also as a clad layer will be described with reference to drawings.

FIG. 8 is a schematical cross-sectional view showing another example of an optical waveguide to be produced according to the present invention and the production steps and FIGS. 8A to 8D show the production steps of the optical waveguide by forming a core layer by the electrodeposition method and transferring the core layer to a substrate having a function also as a clad layer.

Figure 8A:
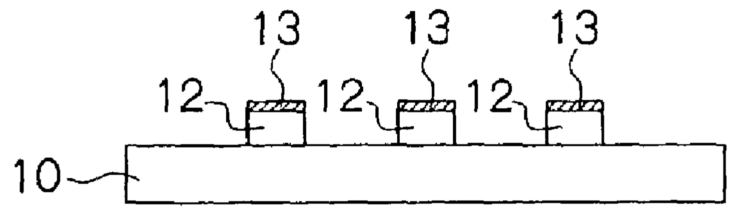
FIG. 8A is a schematical cross-sectional view of a substrate composed of an insulating substrate 10, a conductive thin film 12 formed in a pattern on the insulating substrate 10, and a separation layer 13 formed on the conductive thin film 12.
Figure 8B:
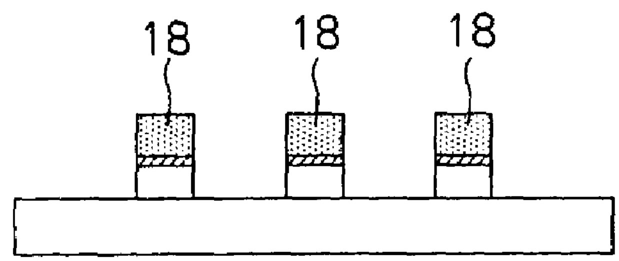
FIG. 8B is a schematical cross-sectional view showing the state where a core layer 18 is formed on the patterned conductive thin film 12 (the separation layer 13) shown in FIG. 8A.
Figure 8C:
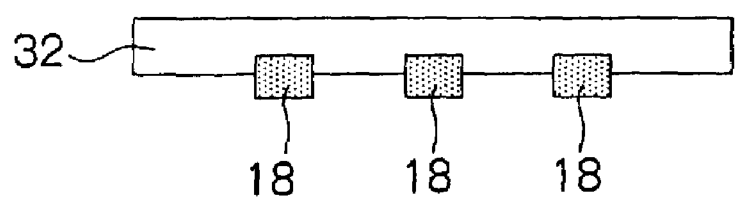
FIG. 8C is a schematical cross-sectional view showing the state where a substrate 32 functioning also as a clad layer is overlaid on the core layer 18 shown in FIG. 8B and subjected to heating and pressurizing treatment and then the separation layer 13 and the core layer 18 are detached from each other, and the substrate shown in FIG. 8A is removed.
Figure 8D:
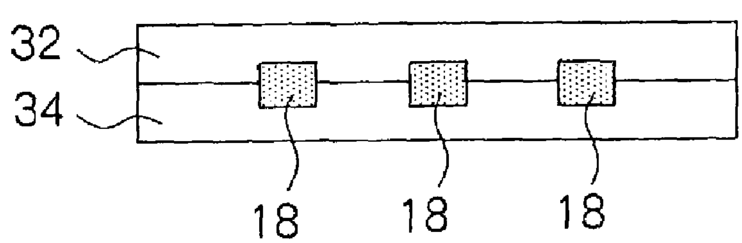
FIG. 8D is a schematical cross-sectional showing the state where another substrate 34 functioning also as another clad layer is overlaid from the opposite face to the face on which the substrate 32 of the core layer 18 is provided on the surface of the core layer 18 shown in FIG. 8C and then subjected to heating and pressurizing treatment.

In FIG. 8A, the numeral character 10 denotes an insulating substrate, 12 a patterned conductive thin film, and 13 a separation layer, respectively. Next, a core layer 18 is formed on the patterned conductive thin film 12 as described above (see FIG. 8B), a substrate 32 functioning also as a clad layer is overlaid on the obtained core layer 18 and subjected to heating and pressurizing treatment (see FIG. 8C). After that, another substrate 34 functioning also as a clad layer is overlaid on the surface of the core layer 18 and then similarly subjected to heating and pressurizing treatment (see FIG. 8D). In such a manner, the optical waveguide as shown in FIG. 8D can be produced.

In the above-mentioned photoelectrodeposition method and electrodeposition method, since the separation layer is formed on the substrate for electrodeposition film formation, at the time of transferring the optical waveguide or the like to the substrate, it is no need to apply intense heat and pressure and thus the substrate, optical waveguide and the like are not damaged.

The separation layer is preferably a layer having a critical surface tension of 30 dyne/cm or lower and causes no effect on the electrodeposition current. Specifically, a commercialized water-proofing fluoro resin spray or the like can be used. Also, silicon resin and silicon oil can be used. Further, a thin film of a unsaturated fatty acid such as oleic acid is also suitable.

In the above-mentioned photoelectrodeposition method and electrodeposition method, the refractive indexes of the clad layer and the core layer can be adjusted by using materials with different diffractive indexes as the above-mentioned film forming material and other than that, by adding fine particles for refractive index adjustment to an electrodeposition solution or by combining these means.

EXAMPLES

Hereinafter, the present invention will be described more particularly with reference to examples. However, the present invention is not limited to the following examples.

Example 1

In this example, an optical waveguide having a structure as shown in FIG. 5D and its production process involving a step of applying voltage exceeding Shottky barrier of a photosemiconductor without radiating light in the case of clad layer formation will be described.

(1) Preparation of Electrodeposition Solution for Core Layer Formation

As an electrodepositive polymer material, a styrene-acrylic acid copolymer having a molecular weight of 11,000, 36% mole ratio of styrene monomer to the total monomers used for polymerization, an acid value of 120, and heavy hydrogen substitution ratio of 33% (hereinafter referred to as electrodepositive polymer material D1) was used. The electrodepositive polymer material D1 was obtained by polymerization using styrene monomer whose hydrogen atoms bonded to the benzene ring were substituted by heavy hydrogen atoms.

Next, to 100 g of pure water, 7.0 g of the electrodepositive polymer material D1 and 0.1 g of titanium oxide with a diameter of 10 nm were added and dispersed and further dimethylaminoethanol (water-soluble; boiling point 110° C. or higher; vapor pressure 100 mHg or lower) was added in a ratio of 180 m-mol/L and further using tetramethylammonium hydroxide and ammonium chloride, pH and the conductivity were adjusted to be 7.8 and 15 mS/cm, respectively, to obtain an electrodeposition solution for core layer formation.

(2) Preparation of Electrodeposition Solution for Clad Layer Formation

As an electrodepositive polymer material, a styrene-acrylic acid copolymer having a molecular weight of 11,000, 21% mole ratio of styrene monomer to the total monomers used for polymerization, an acid value of 120, and heavy hydrogen substitution ratio of 15% (hereinafter referred to as electrodepositive polymer material D2) was used. The electrodepositive polymer material D2 was obtained by polymerization using styrene monomer whose hydrogen atoms bonded to the benzene ring were substituted by heavy hydrogen atoms.

Next, similarly to the foregoing (1), to 100 g of pure water, 7.0 g of the electrodepositive polymer material D2 was added and dispersed and further dimethylaminoethanol was added in a ratio of 180 m-mol/L and further using tetramethylammonium hydroxide and ammonium chloride, pH and the conductivity were adjusted to be 7.8 and 15 mS/cm, respectively, to obtain an electrodeposition solution for clad layer formation.

(3) Production of Substrate for Optical Waveguide Production

A transparent conductive film of ITO (indium tin oxide) with a film thickness of 150 nm was formed on one face of a 0.5 mm-thick alkai-free glass substrate (7059 glass manufactured by Corning Glass Works) by a sputtering method and further on the surface, a $TiO_2$ film with a film thickness of 200 nm was formed by a RF sputtering method.

(4) Production of Optical Waveguide

In the tripolar arrangement as shown in FIG. 4 general in electrochemistry, the electrodeposition solution for clad layer formation was used as an electrodeposition solution and the $TiO_2$ film was utilized as a working electrode to a saturated calomel electrode. Next, when 2.3 V bias voltage was applied to the working electrode for 20 seconds, a lower clad layer with a thickness of 5 μm was formed on the entire face of the $TiO_2$ film-formed face was formed.

Next, without drying the clad layer, employing a proximity aligner (wavelength 365 nm; light intensity 50 mW/cm$^2$) manufactured by Yamashita Denso Co., Ltd. as shown in FIG. 2, and using a photomask for a core and the electrodeposition solution for core layer formation, the bias voltage 1.8 V was applied to the working electrode and UV rays was radiated for 70 seconds through the electrodeposition solution from the upper side of the substrate to form a core layer with a thickness of 21 μm and a width of 20 μm only on the region where light was radiated in the $TiO_2$ film-formed face.

Next, without drying the clad layer and the core layer, the electrodeposition solution was changed to the electrodeposition solution for clad layer formation, bias voltage 6V was applied to the working electrode for 40 seconds to form an upper clad layer with a thickness of 20 μm was formed on the entire face of the $TiO_2$ film-formed face. The resulting substrate in which the core layer and the clad layer were formed in such a manner was taken out from a solution bath and after washed with pure water, the substrate was dried by heated clean air to complete the optical waveguide substrate and obtain an optical waveguide of Example 1.

The produced optical waveguide was cut out into 40 mm length by a dicing saw and subjected to insertion loss measurement to find that the transmission loss was about 0.91 dB/cm at wavelength of 0.85 μm.

Example 2

(1) Preparation of Electrodeposition Solution for Core Layer Formation

As an electrodepositive polymer material, a styrene-acrylic acid copolymer having a molecular weight of 6,000, 38% mole ratio of styrene monomer to the total monomers used for polymerization, an acid value of 113, and heavy hydrogen substitution ratio of 42% (hereinafter referred to as electrodepositive polymer material D3) was used. The electrodepositive polymer material D3 was obtained by polymerization using styrene monomer and acrylic acid monomer whose hydrogen atoms were substituted by heavy hydrogen atoms.

Next, to 100 g of pure water, 7.0 g of the electrodepositive polymer material D3 and 0.5 g of titanium oxide with a diameter of 10 nm were added and dispersed and further dimethylaminoethanol (water-soluble; boiling point 110° C. or higher; vapor pressure 100 mHg or lower) was added in a ratio of 180 m-mol/L and further using tetramethylammonium hydroxide and ammonium chloride, pH and the conductivity were adjusted to be 7.8 and 15 mS/cm, respectively, to obtain an electrodeposition solution for core layer formation.

(2) Preparation of Electrodeposition Solution for Clad Layer Formation

Similarly to the above described (1), to 100 g of pure water, 7.0 g of the electrodepositive polymer material D3 was added and dispersed and further dimethylaminoethanol was added in a ratio of 180 m-mol/L and further using tetramethylammonium hydroxide and ammonium chloride, pH and the conductivity were adjusted to be 7.8 and 45 mS/cm, respectively, to obtain an electrodeposition solution for clad layer formation.

(3) Production of Substrate for Optical Waveguide Production

As a substrate for optical waveguide production, a substrate which is the same as that of Example 1 was produced.

(4) Production of Optical Waveguide

In the tripolar arrangement as shown in FIG. 1 general in electrochemistry, the electrodeposition solution for clad layer formation was used as an electrodeposition solution, the $TiO_2$ electrode was utilized as a working electrode to a saturated calomel electrode, the bias voltage to be applied to the working electrode was set to be 1.8 V, and UV rays were radiated from the rear side of the substrate. UV ray radiation was carried out using a projection type aligner (wavelength 365 nm; light intensity 50 mW/cm$^2$) manufactured by Ushio Inc. The projection type aligner was adjusted so as to focus an image once on the photomask for a lower clad layer and further on the titanium oxide surface, which was the rear face of the substrate through an optical lens. When 35 second-exposure was carried out using the aligner, a lower clad layer with a thickness of 15 μm and a width of 25 μm was formed only on the region where light was radiated in the $TiO_2$ film-formed face (see FIG. 6B).

Next, without drying the clad layer, the electrodeposition solution was changed to the electrodeposition solution for core layer formation and the photomask was changed to a photomask for a core, and when bias voltage 2.8 V was applied to the working electrode and UV rays were radiated for 5 seconds from the rear side of the substrate, a core layer with a thickness of 5 μm and a width of 18 μm was formed only on the region where light was radiated in the $TiO_2$ film-formed face (see FIG. 6C).

Next, without drying the clad layer and the core layer, the electrodeposition solution was changed to the electrodeposition solution for clad layer formation and the photomask was changed to a photomask for formation of a side clad, and when bias voltage 1.8 V was applied to the working electrode and UV rays were radiated for 25 second from the rear side of the substrate, a side clad layer with a thickness of 5 μm was formed only on the region where light was radiated in the $TiO_2$ film-formed face (see FIG. 6D).

Next, without drying the clad layers and the core layer, the electrodeposition solution was changed to the electrodeposition solution for clad layer formation and the photomask was changed to a photomask for an upper clad layer formation, and when bias voltage 1.8 V was applied to the working electrode and UV rays were radiated for 40 second from the rear side of the substrate, an upper clad layer with a thickness of 17 μm was formed only on the region where light was radiated in the $TiO_2$ film-formed face (see FIG. 6E).

The resulting substrate in which the core layer and the clad layers were formed in such a manner was taken out from a solution bath and after washed with pure water, the substrate was dried by heated clean air to complete the optical waveguide substrate and obtain an optical waveguide of Example 2.

The produced optical waveguide was cut out into 30 mm length by a dicing saw and subjected to insertion loss measurement to find that the transmission loss was about 0.81 dB/cm at wavelength of 0.85 μm.

The produced optical waveguide was found having a high shape precision and the top part of the optical waveguide was flat. It was possible to form a photo-functional part such as an optical waveguide and a micro lens array in the portion where no clad layer existed by further carrying out similar photoelectrodeposition process. Further, since the top part of the optical waveguide becomes flat, a photo-functional part could be easily formed on the top part of the optical waveguide by carrying out another process.

Example 3

In this example, an example of production of an optical waveguide having a structure similar to the structure as shown in FIG. 5D by forming titanium oxide, which is a photosemiconductor thin film, by titanium oxidation treatment will be described.

(1) Preparation of Electrodeposition Solution for Clad Layer Formation

To 100 g of pure water, 5 g of the electrodepositive polymer material D3 and 1 g of a magnesium fluoride fine particle (refractive index 1.38) with a diameter of 10 nm were added and dispersed and further dimethylaminoethanol was added in a ratio of 180 m-mol/L and using sodium hydroxide and sodium chloride, pH and the conductivity were adjusted to be 7.8 and 32 mS/cm, respectively to obtain an electrodeposition solution for clad layer formation.

(2) Preparation of Electrodeposition Solution for Core Layer Formation

To 100 g of pure water, 5 g of the electrodepositive polymer material D1 was added and dispersed and further dimethylaminoethanol was added in a ratio of 180 m-mol/L and further using sodium hydroxide and sodium chloride, pH and the conductivity were adjusted to be 7.8 and 52 mS/cm, respectively to obtain an electrodeposition solution for core layer formation.

(3) Production of Substrate for Optical Waveguide Production

The surface of a substrate of a 0.5 mm-thick metal titanium sheet was oxidized by high temperature heating to form a 1,000 nm-thick titanium oxide layer on the surface of the metal titanium sheet and the obtained sheet was used as the substrate for optical waveguide production. Further, the portions other than the portion where the titanium oxide layer was formed on the surface of the titanium sheet were coated with an epoxy resin to insulate the portions.

(4) Production of Optical Waveguide

In the tripolar arrangement as shown in FIG. 4 general in electrochemistry, the electrodeposition solution for clad layer formation was used as an electrodeposition solution and the $TiO_2$ film was utilized as a working electrode to a saturated calomel electrode and when the bias voltage 3 V was applied to the working electrode for 40 seconds, a lower clad layer with a thickness of 25 μm was formed on the entire surface of the $TiO_2$ layer.

Next, without drying the clad layer, the electrodeposition solution was changed to the electrodeposition solution for core layer formation and using a proximity aligner (wavelength 365 nm; light intensity 90 mW/cm$^2$) manufactured by Yamashita Denso Co., Ltd. as shown in FIG. 2 and a photomask for a core, the bias voltage 2.5 V was applied to the working electrode and under such conditions, UV rays was radiated for 21 seconds through the electrodeposition solution from the upper side of the substrate to form a core layer with a thickness of 12 μm only on the region where light was radiated in the $TiO_2$ film-formed face.

Next, without drying the clad layer and the core layer, the electrodeposition solution was changed to the electrodeposition solution for clad layer formation, bias voltage 3V was applied to the working electrode for 20 seconds using the apparatus shown in FIG. 4 to form an upper clad layer with a thickness of 20 μm on the entire face of the $TiO_2$ film-formed face.

The resulting substrate in which the core layer and the clad layers were formed in such a manner was taken out from a solution bath and after washed with pure water, the substrate was dried by heated clean air to complete the optical waveguide substrate and obtain an optical waveguide of Example 3.

The produced optical waveguide was cut out into 20 mm length by a dicing saw and subjected to insertion loss measurement to find that the transmission loss was about 0.94 dB/cm at wavelength of 0.85 μm.

Example 4

In this example, an example of production of an optical waveguide having a structure similar to the structure as shown in FIG. 5D by forming zinc oxide, which is a photosemiconductor thin film, by zinc oxidation treatment by anodization will be described.

(1) Preparation of Electrodeposition Solution for Clad Layer Formation

To 100 g of pure water, 10 g of the electrodepositive polymer material D1 and 0.3 g of a magnesium fluoride fine particle (refractive index 1.38) with a diameter of 10 nm were added and dispersed and further dimethylaminoethanol was added in a ratio of 180 m-mol/L and further using sodium hydroxide and sodium chloride, pH and the conductivity were adjusted to be 7.8 and 52 mS/cm, respectively to obtain an electrodeposition solution for clad layer formation.

(2) Preparation of Electrodeposition Solution for Core Layer Formation

To 100 g of pure water, 5 g of the electrodepositive polymer material D3 and 0.25 g of a magnesium fluoride fine particle (refractive index 2.3) with a diameter of 10 nm were added and dispersed and further dimethylaminoethanol was added in a ratio of 180 m-mol/L and further using sodium hydroxide and sodium chloride, pH and the conductivity were adjusted to be 7.8 and 32 mS/cm, respectively to obtain an electrodeposition solution for core layer formation.

(3) Production of Substrate for Optical Waveguide Production

The surface of a substrate of a 2 mm-thick zinc sheet was oxidized by anodization to form a 1,000 nm-thick zinc oxide layer on the surface of the zinc sheet and the obtained sheet was used as the substrate for optical waveguide production. Further, the portions other than the portion where the zinc oxide layer was formed on the surface of the zinc sheet were coated with an epoxy resin to insulate the portions.

(4) Production of Optical Waveguide

In the tripolar arrangement as shown in FIG. 4 general in electrochemistry, the electrodeposition solution for clad layer formation was used as an electrodeposition solution and the zinc oxide layer was utilized as a working electrode to a saturated calomel electrode and when the bias voltage 3 V was applied to the working electrode for 30 seconds, a lower clad layer with a thickness of 20 μm was formed on the entire surface of the zinc oxide layer.

Next, without drying the clad layer, the electrodeposition solution was changed to the electrodeposition solution for core layer formation and using a He—Cd laser (wavelength 331 nm; light intensity 10 mW/cm$^2$) capable of scanning by a scanning stage shown in FIG. 3, the bias voltage 1.8 V was applied to the working electrode and under such conditions, He—Cd laser was scanned at 0.3 mm/s speed through the electrodeposition solution from the upper side of the substrate to form a core layer with a thickness of 15 μm only on the region where light was radiated in the zinc oxide surface.

Next, without drying the clad layer and the core layer, the electrodeposition solution was changed to the electrodeposition solution for clad layer formation, bias voltage 3V was applied to the working electrode for 90 seconds to form an upper clad layer with a thickness of 20 μm on the entire surface of the clad layer and the core layer.

The resulting substrate in which the core layer and the clad layers were formed in such a manner was taken out from a solution bath and after washed with pure water, the substrate was dried by heated clean air to complete the optical waveguide substrate to obtain an optical waveguide of Example 4.

The produced optical waveguide was cut out into 50 mm length by a dicing saw and subjected to insertion loss measurement to find that the transmission loss was about 0.92 dB/cm at wavelength of 0.85 μm.

Example 5

In this example, an example of production of an optical waveguide having a structure similar to the structure as shown in FIG. 7F by a photoelectrodeposition method and a transfer method will be described.

(1) Production of Substrate for Electrodeposition Film Formation

A transparent conductive film of ITO with a film thickness of 220 nm was formed on one face of a 1 mm-thick alkai-free glass substrate (manufactured by Corning Glass Works) by a sputtering method and further on the surface, a $TiO_2$ film with a film thickness of 300 nm was formed by a RF sputtering method. Next, on the face coated with the $TiO_2$ film, a 1% oleic acid solution (ethyl acetate solvent) was spin-coated at 4,000 rpm for 30 seconds to form a separation layer.

(2) Electrodeposition Solution for Clad Layer and Core Layer

Electrodeposition solutions with the same compositions as those of the electrodeposition solutions used in Example 4 were used.

(3) Formation of Clad Layer and Core Layer

In the same manner as Example 2, a lower clad layer-a core layer-a side part clad layer-an upper clad layer (see FIGS. 7B to 7E) were formed on the separation layer and the resulting substrate was taken out from a solution bath and after washed with water, the substrate was dried by clean air to produce an optical waveguide.

(4) Transfer of Optical Waveguide

A 0.5 mm-thick polyester film heated to 150° C. was put on the surface of the above-mentioned optical waveguide and they were heated and pressurized between two rolls at a linear speed of 10 mm/sec under linearly pressurizing state of 400 g/cm. After that, the foregoing separation layer and the optical waveguide were detached from each other to transfer the produced optical waveguide to the polyester film to obtain an optical waveguide of Example 5 of which the optical waveguide was formed on the surface of the film.

A linear part with 50 mm size was cut out of the obtained optical waveguide and subjected to insertion loss measurement to find that the transmission loss was 0.96 dB/cm at wavelength of 0.85 μm.

Example 6

(1) Preparation of Electrodeposition Solution for Core Layer Formation

As an electrodepositive polymer material, a styrene-acrylic acid-butyl acrylate copolymer having a molecular weight of 18,000, mole ratio (%) of styrene monomer, acrylic acid monomer, and butyl acrylate monomer of 35:15:50, an acid value of 120, and heavy hydrogen substitution ratio of 52% (hereinafter referred to as electrodepositive polymer material D4) was used. The electrodepositive polymer material D4 was obtained by polymerization using styrene monomer whose hydrogen atoms bonded to the benzene ring were substituted by heavy hydrogen atoms.

Next, to 100 g of pure water, 7.0 g of the electrodepositive polymer material D4 and 0.5 g of titanium oxide with a diameter of 10 nm were added and dispersed and further dimethylaminoethanol (water-soluble; boiling point 110° C. or higher; vapor pressure 100 mHg or lower) was added in a ratio of 180 m-mol/L and further using tetramethylammonium hydroxide and ammonium chloride, pH and the conductivity were adjusted to be 7.8 and 55 mS/cm, respectively to obtain an electrodeposition solution for core layer formation.

(2) Preparation of Electrodeposition Solution for Clad Layer Formation

Similarly to the foregoing (1), to 100 g of pure water, 7.0 g of the electrodepositive polymer material D4 was added and dispersed and further dimethylaminoethanol was added in a ratio of 180 m-mol/L and further using tetramethylammonium hydroxide and ammonium chloride, pH and the conductivity were adjusted to be 7.8 and 75 mS/cm, respectively, to obtain an electrodeposition solution for clad layer formation.

(3) Production of Substrate for Optical Waveguide Production

As a substrate for optical waveguide production, the same substrate as that of Example 1 was produced.

(4) Production of Optical Waveguide

In the tripolar arrangement as shown in FIG. 1 general in electrochemistry, the electrodeposition solution for clad layer formation was used as an electrodeposition solution and the $TiO_2$ film was utilized as a working electrode to a saturated calomel electrode and the bias voltage to be applied to the working electrode was adjusted to be 1.8 V, UV rays were radiated from the rear side of the substrate. As UV rays, a projection type aligner manufactured by Ushio Denki Inc. (wavelength 365 nm; light intensity 80 $mW/cm^2$) was employed. The projection type aligner was controlled so as to once focus an image on a photomask for the lower clad and then focus an image on the titanium oxide surface, the rear face of the substrate, through an optical lens. When exposure was carried out for 25 seconds using this aligner, a lower clad layer with a thickness of 10 μm and a width of 25 μm was formed only on the region where light was radiated in the $TiO_2$ film-formed face (see FIG. 6B).

Next, without drying the clad layer, the electrodeposition solution was changed to the electrodeposition solution for core layer formation and the photomask was changed to a photomask for core, and when bias voltage 1.8 V was applied to the working electrode and UV rays were radiated from the rear side of the substrate for 75 seconds, a core layer with thickness of 21 μm and a width of 45 μm was formed only on the region where light was radiated in the $TiO_2$ film-formed face (see FIG. 6C).

Next, without drying the clad layer and the core layer, the electrodeposition solution was changed to the electrodeposition solution for clad layer formation and the photomask was changed to a photomask for a side face clad, and when bias voltage 1.8 V was applied to the working electrode and UV rays were radiated from the rear side of the substrate for 25 seconds, a side face clad layer with a thickness of 55 μm was formed only on the region where light was radiated in the $TiO_2$ film-formed face (see FIG. 6D).

Next, without drying the clad layers and the core layer, the electrodeposition solution was changed to the electrodeposition solution for clad layer formation and the photomask was changed to a photomask for an upper clad, and when bias voltage 2.8 V was applied to the working electrode and UV rays were radiated from the rear side of the substrate for 40 seconds, an upper clad layer with a thickness of 15 μm was formed only on the region where light was radiated in the $TiO_2$ film-formed face (see FIG. 6E).

The resulting substrate in which the core layer and the clad layers were formed in such a manner was taken out from a solution bath and after washed with pure water, the substrate was dried by heated clean air to complete the optical waveguide substrate and obtain an optical waveguide of Example 6.

The produced optical waveguide was cut out into 50 mm length by a dicing saw and subjected to insertion loss measurement to find that the transmission loss was about 0.95 dB/cm at wavelength of 0.85 μm.

Comparative Example 1

In place of the electrodepositive polymer material D1 subjected to heavy hydrogen atom substitution in Example 1, as an electrodepositive polymer material, the electrodepositive polymer material D1 of which no hydrogen was substituted by heavy hydrogen atom (hereinafter, referred to as electrodepositive polymer material D01) was used. Incidentally, at the time of polymerization of the electrodepositive polymer material D01, the same monomers used for the case of polymerization of the electrodepositive polymer material D1 were used, except that the monomers were not subjected to heavy hydrogen atom substitution.

Except that the electrodepositive polymer materials used were different, an optical waveguide of Comparative Example 1 was produced in the same manner as Example 1 and subjected to evaluation. As a result, the optical waveguide was found having a transmission loss of 1.42 dB/cm at wavelength of 0.85 μm.

Comparative Example 2

In place of the electrodepositive polymer material D3 subjected to heavy hydrogen atom substitution in Example 2, as an electrodepositive polymer material, the electrodepositive polymer material D3 of which no hydrogen was substituted by heavy hydrogen atom (hereinafter, referred to as electrodepositive polymer material D03) was used. Incidentally, at the time of polymerization of the electrodepositive polymer material D03, the same monomers used for the case of polymerization of the electrodepositive polymer material D3 were used, except that the monomers were not subjected to heavy hydrogen atom substitution.

Except that the electrodepositive polymer materials used were different, an optical waveguide of Comparative Example 2 was produced in the same manner as Example 2 and subjected to evaluation. As a result, the optical waveguide was found having a transmission loss of 1.42 dB/cm at wavelength of 0.85 μm.

Next, the above-mentioned preferred embodiments of the present invention are as follows.

One preferred embodiments of the present invention is an electrodeposition solution, wherein the foregoing electrodepositive polymer material may include a copolymer obtained by polymerization of at least a hydrophobic monomer and a hydrophilic monomer.

Another preferred embodiment of the present invention is an electrodeposition solution, wherein the foregoing electrodepositive polymer material may include a copolymer obtained by polymerization of at least a hydrophobic monomer, a hydrophilic monomer, and a plastic monomer.

Another preferred embodiment of the present invention is an electrodeposition solution, wherein the foregoing electrodepositive polymer material may include a copolymer obtained by polymerization using at least one kind of monomers, which comprises hydrogen atoms, wherein in said at least one of the hydrogen atoms at least one kind of monomers has been substituted by a heavy hydrogen atom.

Another preferred embodiment of the present invention is an electrodeposition solution, wherein the light may be a laser beam with a wavelength of 850 nm.

Another preferred embodiment of the present invention is an electrodeposition solution, wherein 20% to 60% of hydrogen atoms composing the foregoing electrodepositive polymer material may be substituted by heavy hydrogen atoms.

Another preferred embodiment of the present invention is an electrodeposition solution, wherein the electrodeposition solution may includes fine particles for refractive index adjustment.

Another preferred embodiment of the present invention is an electrodeposition solution, wherein the foregoing electrodepositive polymer material may be a copolymer obtained by polymerization of at least a styrene monomer and an acrylic acid monomer, at least one hydrogen atom selected from a group consisting of hydrogen atoms contained in the foregoing styrene monomer before polymerization and hydrogen atoms contained in the foregoing acrylic acid before polymerization is substituted by a heavy hydrogen atom and the foregoing light is a laser beam with a wavelength of 850 nm.

As described above, one aspect of the present invention is an electrodeposition solution, which is capable of depositing and forming an electrodeposition film of an electrodeposition material including an electrodepositive polymer material, wherein 10 to 90% of hydrogen atoms included in the above-mentioned electrodepositive polymer material are substituted by heavy hydrogen atoms and a transmission loss of the electrodeposition film to light in a wavelength region of 700 nm to 1,350 nm is no more than 1 dB/cm.

Further, another aspect of the present invention is an optical part for transmitting information with light in a wavelength region at least from 700 nm to 1,350 nm, wherein at least a portion of the light transmitting portion of the above-mentioned optical part is formed by electrodeposition using an electrodeposition solution containing at least an electrodepositive polymer material as an electrodeposition material, 10 to 90% of hydrogen atoms included in the above-mentioned electrodepositive polymer material are substituted by heavy hydrogen atoms, and a transmission loss of an electrodeposition film of the electrodeposition material to light in a wavelength region of 700 nm to 1,350 nm is no more than 1 dB/cm.

Still, another aspect of the present invention is a production method of an optical part for transmitting information with light in a wavelength region at least from 700 nm to 1,350 nm, wherein at least a portion of the light transmitting portion of the above-mentioned optical part is formed by electrodeposition using an electrodeposition solution containing at least an electrodepositive polymer material as an electrodeposition material, 10 to 90% of hydrogen atoms included in the above-mentioned electrodepositive polymer material are substituted by heavy hydrogen atoms, and a transmission loss of an electrodeposition film of the electrodeposition material to light in a wavelength region of 700 nm to 1,350 nm is no more than 1 dB/cm.

Thus, the present invention provides an electrodeposition solution which makes it possible to make fine pattern formation easy; generate harmful waste liquid in slight amount; and to easily produce an optical part such as an optical waveguide with a low transmission loss and a high shape precision with good mass productivity by employing an electrodeposition method or a photoelectrodeposition method and also provides an optical part produced using the electrodeposition solution and a production method for the optical part.

What is claimed is:

1. An optical part comprising a light transmitting portion for transmitting information with light in a wavelength region of 700 nm to 1,350 nm, wherein the optical part is produced by a process of forming at least a portion of the light transmitting portion using an electrodeposition solution, which contains an electrodeposition material, by deposition of the electrodeposition material from the electrodeposition solution, the electrodeposition material contains at least an electrodepositive polymer material comprising hydrogen atoms, 10 to 90% of the hydrogen atoms are substituted by heavy hydrogen atoms and a transmission loss of the light transmitting portion to light in the wavelength region of 700 nm to 1,350 nm is no more than 1 dB/cm.

2. An optical part according to claim 1, wherein the optical part is an optical waveguide.

3. An optical part according to claim 1, wherein the light is a laser beam with a wavelength of 850 nm.

4. An optical part according to claim 1, wherein 20% to 60% of the hydrogen atoms are substituted by heavy hydrogen atoms.

5. An optical part according to claim 1, wherein the electrodeposition solution includes fine particles for refractive index adjustment.

6. An optical part according to claim 1, wherein the electrodepositive polymer material is a copolymer obtained by polymerization of at least a styrene monomer and an acrylic acid monomer, at least one hydrogen atom selected from a group consisting of hydrogen atoms contained in the styrene monomer before polymerization and hydrogen atoms contained in the acrylic acid before polymerization is substituted by a heavy hydrogen atom and the light is a laser beam with a wavelength of 850 nm.

7. A production method for an optical part including a light transmitting portion for transmitting information with light in a wavelength region of 700 to 1350 nm, the method comprising the step of:

forming at least a portion of the light transmitting portion by depositing an electrodeposition material from an electrodeposition solution, wherein the electrodeposition material includes at least an eletrodepositive polymer material comprising hydrogen atoms, 10 to 90% of the hydrogen atoms are substituted by heavy hydrogen atoms, and a transmission loss of the light transmitting portion to light in the wavelength region of 700 to 1350 nm is no more than 1 dB/cm.

8. A production method of an optical part according to claim 7, wherein the optical part is an optical waveguide.

9. A production method of an optical part according to claim 7, wherein the light is a laser beam with a wavelength of 850 nm.

10. A production method of an optical part according to claim 7, wherein 20% to 60% of the hydrogen atoms are substituted by heavy hydrogen atoms.

11. A production method of an optical part according to claim 7, wherein the electrodeposition solution includes fine particles for refractive index adjustment.

12. A production method of an optical part according to claim 7, wherein the electrodepositive polymer material is a copolymer obtained by polymerization of at least a styrene monomer and an acrylic acid monomer and at least one hydrogen atom selected from a group consisting of hydrogen atoms contained in the styrene monomer before polymerization and hydrogen atoms contained in the acrylic acid before polymerization is substituted by a heavy hydrogen atom and the light is a laser beam with a wavelength of 850 nm.

13. A production method of an optical part according to claim 7, wherein further comprising the following step heating the electrodeposition material with a heated clean air.

* * * * *